(12) United States Patent
Hiraguchi

(10) Patent No.: US 7,175,123 B2
(45) Date of Patent: Feb. 13, 2007

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 42 days.

(21) Appl. No.: 10/901,992

(22) Filed: Jul. 30, 2004

(65) Prior Publication Data
US 2005/0023399 A1 Feb. 3, 2005

(30) Foreign Application Priority Data
Aug. 1, 2003 (JP) ............................. 2003-284632

(51) Int. Cl.
G03B 23/02 (2006.01)

(52) U.S. Cl. .................. 242/343.2; 242/338.1; 242/348; 360/132

(58) Field of Classification Search ............... 242/343, 242/343.1, 343.2, 338, 338.1, 338.2, 348; 360/132
See application file for complete search history.

(56) References Cited

U.S. PATENT DOCUMENTS

| | | | | |
|---|---|---|---|---|
| 4,033,523 A | * | 7/1977 | Roman ..................... 242/338.1 |
| 5,366,173 A | * | 11/1994 | Lammers et al. .......... 242/338.1 |
| 5,813,622 A | | 9/1998 | Von Alten |
| 5,893,527 A | * | 4/1999 | Mizutani et al. ............. 242/348 |
| 5,901,916 A | | 5/1999 | McAllister et al. |
| 6,038,112 A | * | 3/2000 | Kletzl ......................... 360/132 |
| 6,043,963 A | * | 3/2000 | Eaton ......................... 360/132 |
| 6,264,126 B1 | * | 7/2001 | Shima et al. ................ 242/343 |
| 6,271,991 B1 | | 8/2001 | Saliba et al. |
| 6,411,466 B1 | * | 6/2002 | Shima et al. ................ 360/132 |
| 2001/0028010 A1 | * | 10/2001 | Tsuyuki et al. ........... 242/338.1 |
| 2002/0190149 A1 | * | 12/2002 | Tsuyuki et al. ........... 242/338.1 |
| 2003/0057309 A1 | * | 3/2003 | Tsuyuki et al. ........... 242/338.1 |
| 2003/0132332 A1 | * | 7/2003 | Amano et al. ............... 242/348 |

* cited by examiner

*Primary Examiner*—William A. Rivera
(74) *Attorney, Agent, or Firm*—Sughrue Mion, PLLC

(57) ABSTRACT

In a recording tape cartridge, a braking member positioned at a restricting position within a reel hub in a state of abutting an inner surface of a floor plate of a case when the recording tape cartridge is not in use, is held at the restricting position by a top end surface of the braking member abutting a bottom end surface of a clutch member. Upward movement of a reel is restricted. When a release operation portion is pushed by a releasing portion of a drive device and the clutch member rotates, due to cam grooves and cam projections converting torque of the clutch member into axial direction moving force, the braking member, whose held state is cancelled by the bottom end surface sliding along the top end surface, moves to a rising-up permitting position, such that rising-up of the reel within the case is permitted.

31 Claims, 10 Drawing Sheets

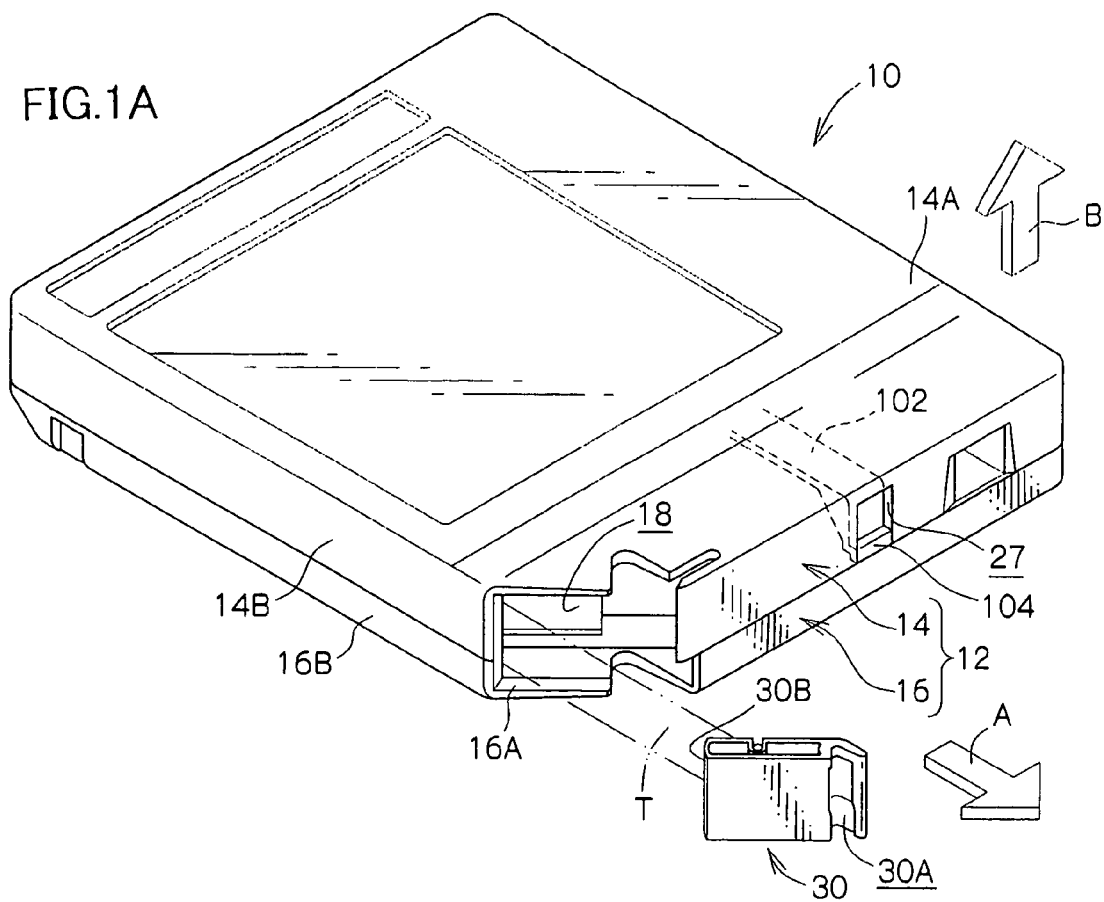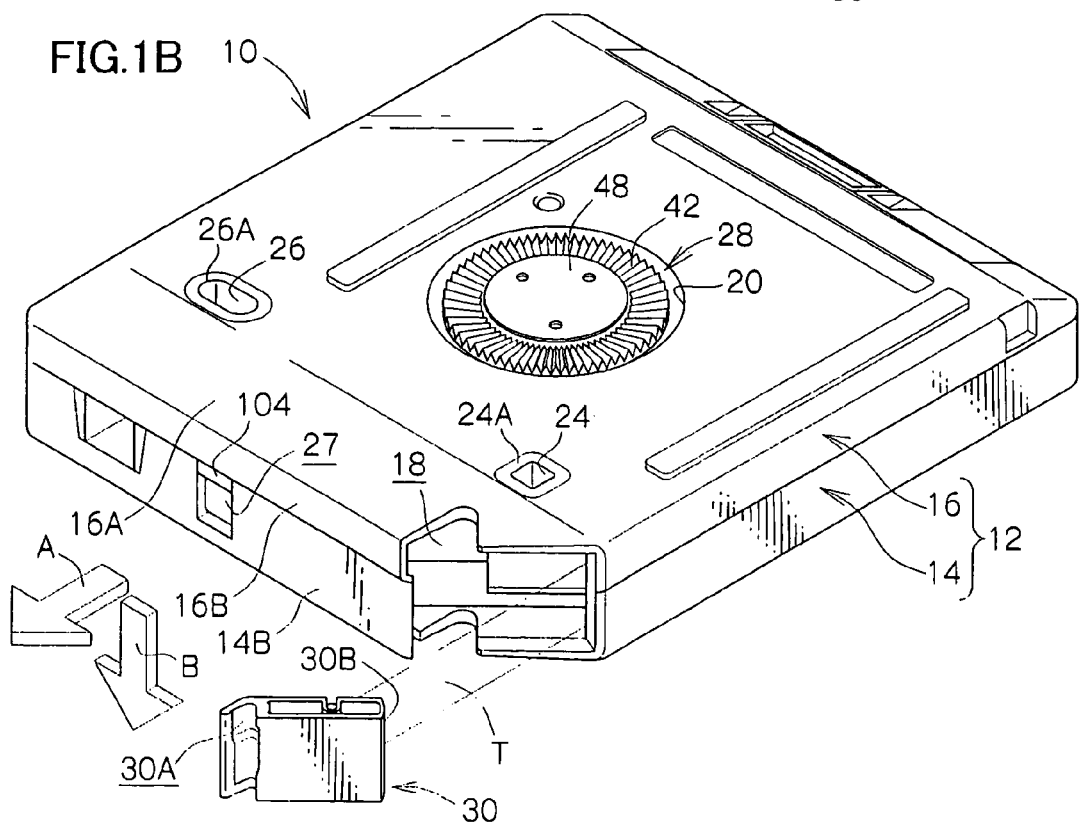

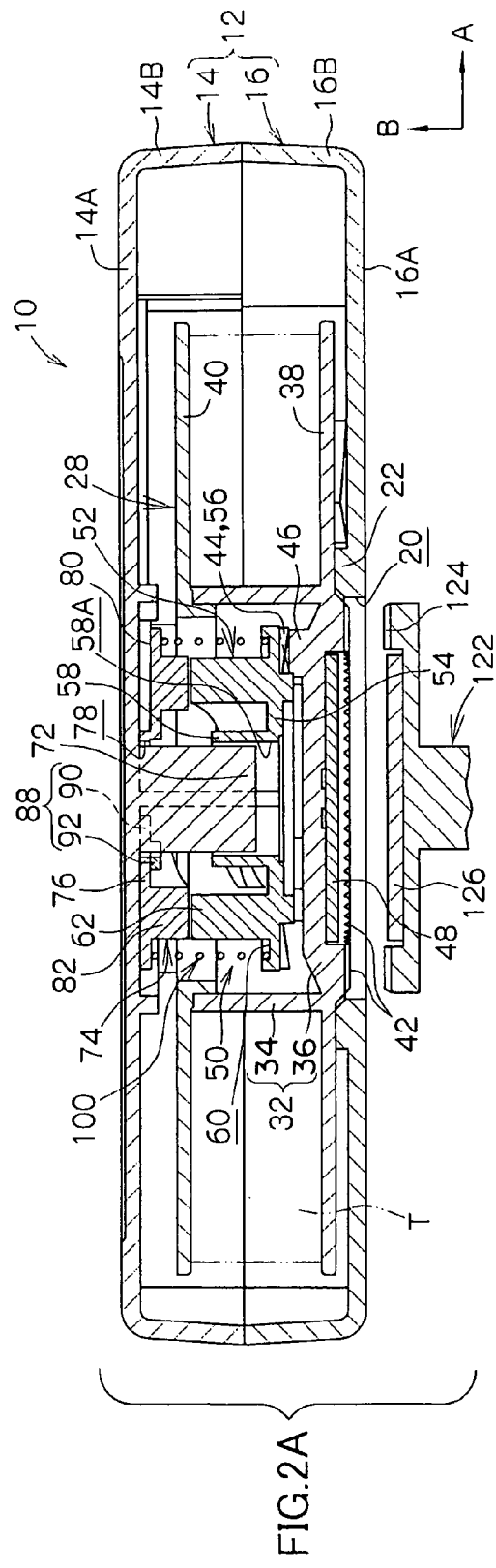
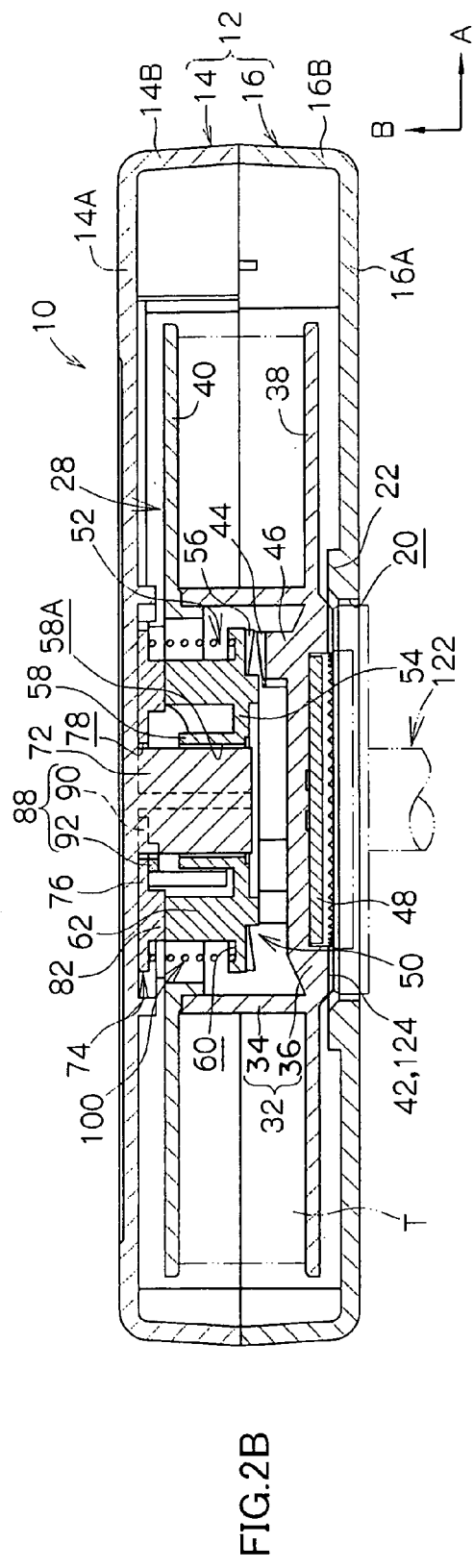
FIG.2A
FIG.2B

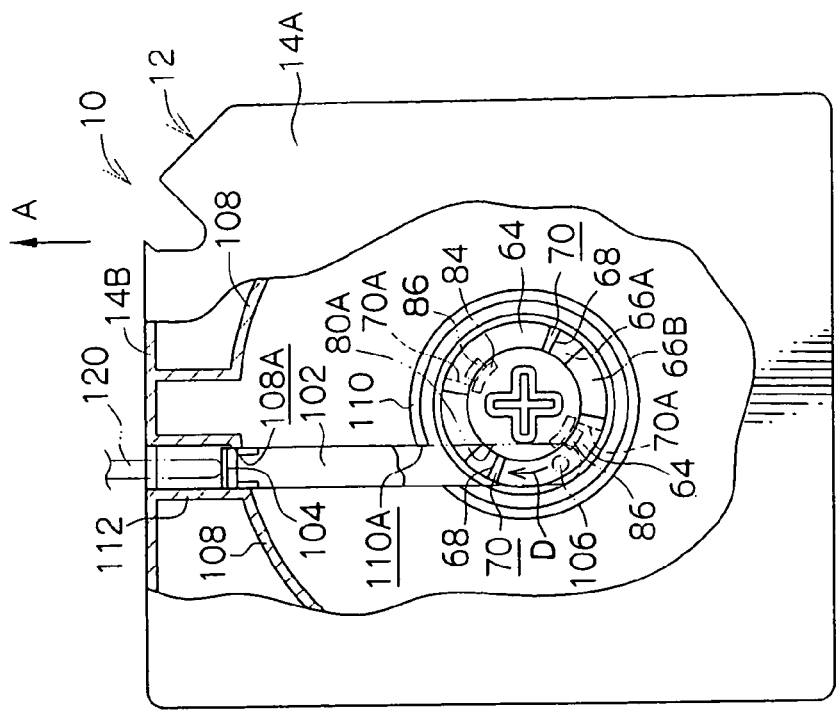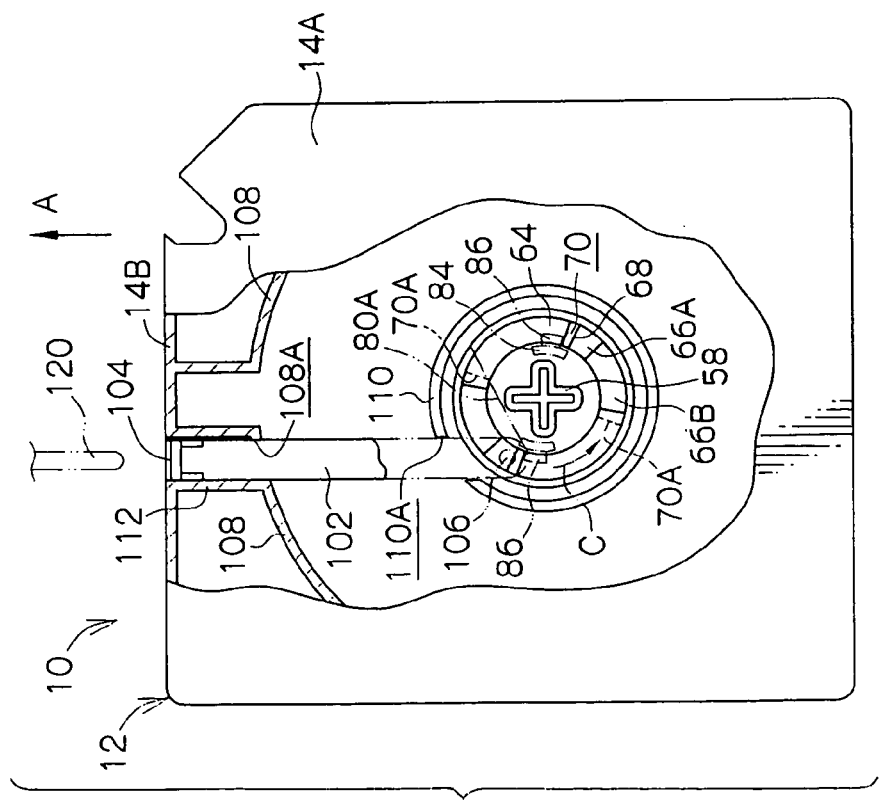

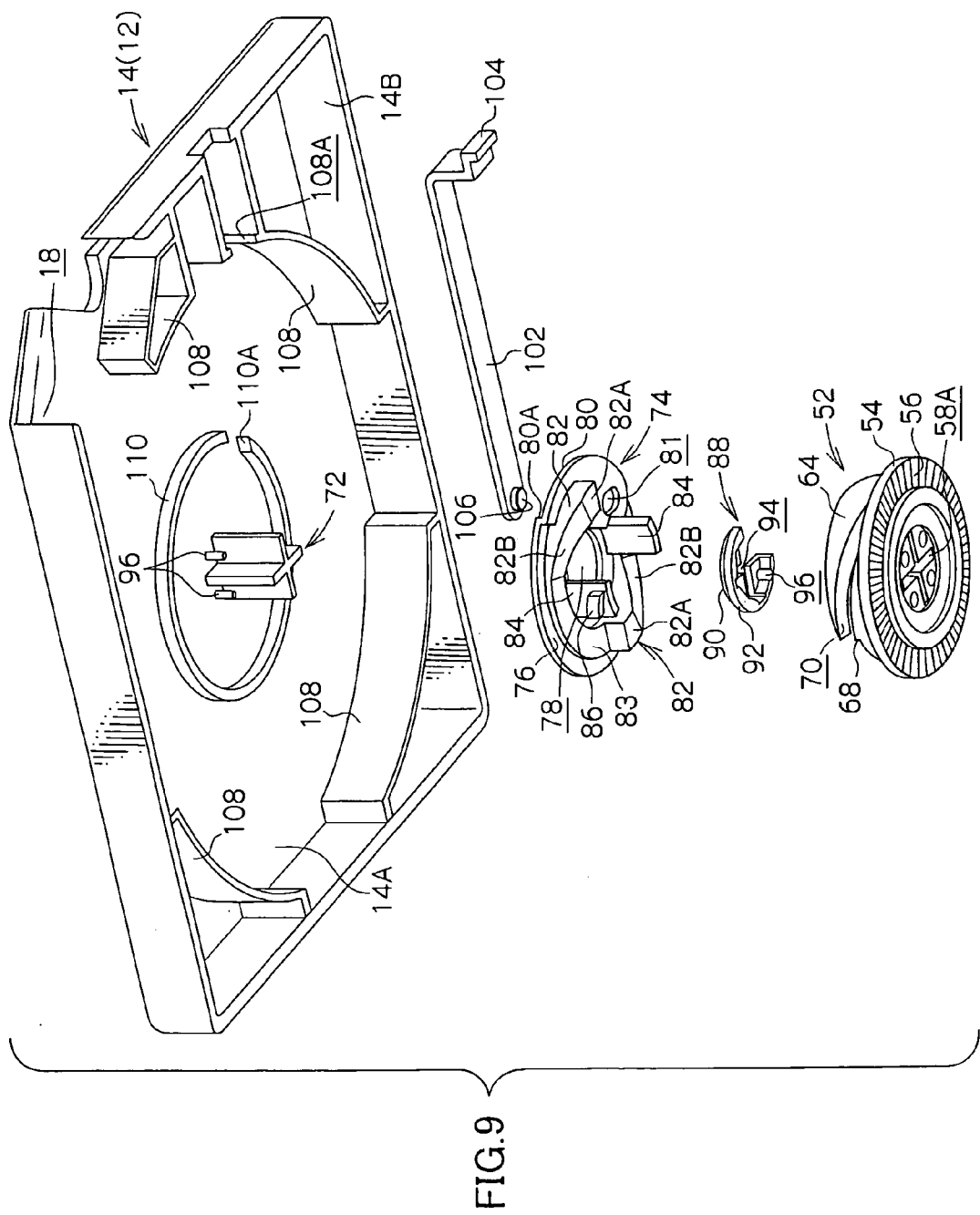

RECORDING TAPE CARTRIDGE

CROSS-REFERENCE TO RELATED APPLICATION

This application claims priority under 35 USC 119 from Japanese Patent Application No. 2003-284632, the disclosure of which is incorporated by reference herein.

BACKGROUND OF THE INVENTION

1. Field of the Invention

The present invention relates to a recording tape cartridge which rotatably accommodates a reel around which a recording tape, such as a magnetic tape or the like, is wound.

2. Description of the Related Art

Recording tapes such as magnetic tapes and the like are used as external recording media for computers and the like. Little space is required to accommodate such a recording tape at the time of storage thereof, and a large amount of information can be recorded thereon. A so-called single-reel recording tape cartridge is used in which a single reel, on which the recording tape is wound, is rotatably accommodated within a case.

Such a recording tape cartridge has a braking means so that the reel does not rotate within the case when the recording tape cartridge is not in use (see, for example, U.S. Pat. No. 5,813,622). This U.S. Pat. No. 5,813,622 discloses the following structure: an engaging gear is provided in an annular form at the floor surface of a reel hub which is shaped as a hollow cylinder having a floor and which structures the axially central portion of a reel. A braking member, which is disc-shaped and at which is provided a braking gear which can mesh with the engaging gear, is inserted within the reel hub. The braking member is supported so as to be unable to rotate with respect to the case, and so as to be slidable in the axial direction of the reel. Due to the urging force of a compression coil spring provided between the case and the braking member, the braking gear is made to mesh with the engaging gear of the reel. In this state, the reel is pressed against the floor plate of the case by the urging force of the compression coil spring. Rotation of the reel with respect to the case is locked due to the braking gear of the braking member meshing with the engaging gear due to this urging force.

In this structure, a pass-through hole is formed in the floor portion of the reel hub. When a releasing portion of a drive device enters in from this through hole and pushes the braking member upward against the urging force of the compression coil spring, the meshed-together state of the braking gear and the engaging gear is cancelled, and rotation of the reel with respect to the case is permitted. The releasing portion of the drive device is provided at a rotating shaft together with a driving gear which meshes with a reel gear formed at the end surface of the reel hub. As the driving gear meshes with the reel gear, the releasing portion pushes the braking member upward. Accordingly, in this structure, when the rotating shaft drives and rotates the reel, the braking member, which cannot rotate with respect to the case, and the releasing portion, which rotates integrally with the rotating shaft, slidingly-contact one another while being pressed against one another due to the urging force of the compression coil spring. In order to reduce the resistance to rotation which arises accompanying this sliding-contact, the braking member and the releasing portion are both formed of resin materials.

Further, a structure which is similar to that disclosed in above-described U.S. Pat. No. 5,813,622 has been conceived of in which a releasing member, which rotates integrally with the reel, is provided between the braking member and the floor surface of the reel hub (see, for example, U.S. Pat. No. 5,901,916). Specifically, due to the releasing member being pushed by a releasing portion of a drive device, the releasing member is pushed upward together with the braking member against the urging force of the compression coil spring. In this way, the braking member is pushed upward by the releasing portion via the releasing member, and the locked state of the reel is cancelled. In this structure, due to the releasing member rotating integrally with the reel at the time when the reel is driven to rotate, the releasing portion and the releasing member do not slidingly-contact one another, and the releasing member and the braking member slidingly-contact one another.

Moreover, a structure is known in which, at the time when the reel is driven to rotate, the braking member does not slidingly-contact any other portion (see, for example, U.S. Pat. No. 6,271,991). In this structure, the engaging gear is formed at the outer peripheral portion of a flange of the reel. Rotation of the reel is locked due to two braking members, each of which is swingably supported within the case and is urged in a direction of meshing with the engaging gear, meshing together with the engaging gear. Further, when this recording tape cartridge is loaded into a drive device, the locking members are pushed by releasing portions of the drive device, and swing against the aforementioned urging force. In this way, the meshing together of the locking members and the engaging gear is released, and rotation of the reel is permitted. These releasing portions are respectively provided independently of the rotating shaft, and push the locking members due to the loading of the recording tape cartridge (the case) into the drive device or the lowering of the recording tape cartridge (the case) within the drive device. In this structure, the compression coil spring, which is for pressing the reel against the case or the rotating shaft, is connected to the reel via a bearing. Relative rotation between the compression coil spring and the reel is absorbed by the bearing.

However, in the recording tape cartridges relating to the above-described structures, when the recording tape is not being used, the reel is pressed against the floor plate of the case by the urging force of a compression coil spring. Therefore, when force resisting the urging force of the compression coil spring is applied, upward and downward movement of the reel within the case cannot be impeded (locked). Thus, for example, if the region where the reel gear is formed at the reel, which region is exposed from the case (i.e., the outer surface of the floor portion of the reel hub), were to be pushed or if impact of a drop were to be applied to this region, the reel would joggle greatly within the case, which could be a cause of damage to the recording tape whose one end portion is held at the case via a leader member.

Moreover, in the structures disclosed in U.S. Pat. No. 5,813,622 and U.S. Pat. No. 5,901,916, the urging force of the compression coil spring is applied as drag to the region of sliding contact between the braking member and the releasing member, or between the braking member and the releasing portion of the drive device. Therefore, when, in accordance with the trend of making recording tape cartridges have higher recording capacities, the recording tape is made to be longer and the rotational speed of the reel is made to be a high speed, or the time over which the reel is continuously driven is extended, there is the concern that wear will arise at these regions of sliding contact. On the other hand, in the structure disclosed in U.S. Pat. No. 6,271,991, the urging means for urging the braking members in the direction of meshing with the engaging gear, and the compression coil spring which urges the reel toward the floor plate of the case, are separate members. Therefore, the relative rotation between the reel and the compression coil spring cannot be absorbed by the braking members which rotate relative to the reel, and this relative rotation must be absorbed by an expensive bearing.

In this way, in conventional recording tape cartridges, there is still room for improvement of the structure for holding a reel in a case when the recording tape cartridge is not being used.

SUMMARY OF THE INVENTION

In view of the aforementioned, an object of the present invention is to provide a recording tape cartridge in which a reel can be prevented from moving greatly in an axial direction within a case at times when the recording tape cartridge is not being used.

In order to achieve the above-described object, a first aspect of the present invention is a recording tape cartridge comprising: a reel having, at an axially central portion thereof, a hub which is formed in a shape of a hollow cylinder having a floor and around whose outer peripheral portion a recording tape is wound, the reel being accommodated within a case and being able to approach and move away from an inner surface of a floor plate of the case; a movable member provided within the hub so as to be able to approach and move away from a floor portion of the hub, and able to be set at a restricting position, at which the movable member has approached the floor portion and restricts moving-away of the reel, which is abutting the inner surface of the floor plate, from the floor plate, and a rising-up permitting position, at which the movable member has moved away from the floor portion and permits moving-away of the reel from the floor plate; and a switching section having a pushed portion which can be pushed from an exterior of the case, and provided between the case and the movable member, and when the recording tape is not in use, the switching section holds the movable member at the restricting position, and when the pushed portion is pushed by a releasing portion of a drive device, the switching section releases a held state of the movable member and moves the movable member to the rising-up permitting position.

In the recording tape cartridge of the first aspect of the present invention, when the recording tape cartridge is not being used, the switching section holds the movable member at the restricting position. In this way, the movable member is adjacent to the floor portion of the hub of the reel which is abutting the inner surface of the floor plate of the case, and moving-away of the reel from the floor plate of the case is restricted. On the other hand, when the recording tape cartridge is loaded into a drive device and the releasing portion of the drive devices pushes the pushed portion of the switching section, the switching section cancels the held state of the movable member, and moves the movable member away from the floor portion of the hub. In this way, the reel can move away from the floor plate, and is raised-up within the case and driven to rotate with respect to the case and without contacting the case by, for example, a rotating shaft of the drive device.

Here, the switching section holds the movable member at the restricting position when the recording tape cartridge is not in use. In other words, when the recording tape cartridge is not being used, movement of the movable member from the restricting position (i.e., the movable member moving away from the floor portion of the hub) is restricted (impeded) by the switching section. Therefore, when the recording tape cartridge is not being used, even if force attempting to move the reel in the axial direction is applied to the reel, the moving away of the reel from the floor plate of the case is restricted, and great movement of the reel in the axial direction within the case (relatively great joggling of the reel within the case) is prevented.

In this way, in the recording tape cartridge relating to the first aspect of the present invention, the reel can be prevented from moving greatly in the axial direction within the case at times when the recording tape cartridge is not in use.

Note that the movable member which is positioned at the restricting position may permit slight movement of the reel in the axial direction (to the extent that the recording tape is not damaged). Further, the holding of the movable member at the restricting position by the switching section may be carried out by, for example, engagement of the movable member and (a structural part of) the switching section, or by frictional contact between the movable member and the switching section.

In a recording tape cartridge of a second aspect of the present invention, the movable member is supported so as to be unable to rotate with respect to the case, and the movable member is formed such that, when the movable member is positioned at the restricting position, the movable member engages with an engaging portion provided at the floor portion of the hub and impedes rotation of the reel with respect to the case, and when the movable member is positioned at the rising-up permitting position, an engaged state of the movable member with the engaging portion is released and the movable member permits rotation of the reel with respect to the case.

In the recording tape cartridge of the second aspect of the present invention, an engaging portion, which can engage with the movable member, is provided at the floor portion of the hub. The engaging portion engages with the movable member which is positioned at the restricting position. When the movable member moves to the rising-up permitting position, the state of engagement of the engaging portion with the movable member is cancelled. Due to the movable member being supported so as to be unable to rotate with respect to the case, rotation of the reel with respect to the case is impeded when the movable member is positioned at the restricting position, and rotation of the reel with respect to the case is possible when the movable member moves to the rising-up permitting position.

In this way, the movable member, which is for preventing joggling of the reel within the case when the recording tape cartridge is not in use, exhibits a braking function of impeding rotation of the reel with respect to the case when recording tape cartridge is not in use. In other words, the movable member also functions as a braking member. Therefore, a structure which can prevent joggling of the reel within the case when the recording tape cartridge is not being used can be realized without increasing the number of parts.

In a recording tape cartridge of a third aspect of the present invention, the switching section is structured so as to include: a rotating member provided so as to be able to rotate with respect to the case in a plane which is orthogonal to an axis of the reel and so as to be unable to move in a direction of the axis, and when the pushed portion is pushed by the releasing portion, the rotating member rotates in a predetermined direction with respect to the case; a pair of abutment surfaces formed respectively at the movable member and the rotating member substantially orthogonal to the direction of the axis, and when the movable member is positioned at the restricting position, the pair of abutment surfaces slidably abut one another, and as the rotating member rotates in the predetermined direction, a state of abutment between the abutment surfaces is cancelled; and a cam portion provided at one of the movable member and the rotating member, and as the rotating member rotates in the predetermined direction, the cam portion slides along a contact element provided at another of the movable member and the rotating member and moves the movable member away from the floor portion.

In the recording tape cartridge of the third aspect, in the state in which the movable member is positioned at the restricting position, the abutment surface of the movable member and the abutment surface of the rotating member, which abutment surfaces are respectively substantially orthogonal to the axis of the reel, abut one another. Even if force, in the axial direction of the reel, which moves the reel away from the floor plate of the case (i.e., which moves the movable member away from the floor portion of the hub) is applied, movement of the movable member from the restricting position is impeded (the movable member is held at the restricting position). In this way, when the recording tape cartridge is not being used, it is possible to reliably prevent the reel from moving greatly in the axial direction.

When, from this state, the pushed portion of the switching section is pushed by the releasing portion of the drive device and the rotating member rotates in a predetermined direction, the pair of abutment surfaces slide along one another, and the state of abutment is cancelled. While the cam portion slides along the contact element, the switching section converts (a portion) of this torque into moving force in the direction of moving the movable member away from the floor portion of the hub. The movable member thereby moves to the rising-up permitting position. In this way, in the present recording tape cartridge, the switching section is realized with a simple structure.

Note that, if a positive motion cam mechanism is structured by the cam portion and the contact element, the movable member can be reliably made to return to the restricting position due to the rotation of the rotating member in the direction opposite to the predetermined direction. Therefore, it is possible to form a structure which does not have an urging portion which urges the movable member toward the restricting position. In accordance with such a structure, even if there is a structure in which the pushed portion slidingly contacts the rotating shaft or the like of the drive device as the reel rotates, friction resistance based on urging force is not applied to the portion where there is sliding contact. Thus, wear of the sliding contact portion of the pushed portion or a member at the drive device is prevented or markedly suppressed.

In a recording tape cartridge of a fourth aspect of the present invention, the switching section is structured so as to further include an arm member whose longitudinal direction is a direction intersecting the axis of the reel and whose longitudinal direction one end portion is the pushed portion and whose longitudinal direction other end portion is connected to the rotating member, and when the pushed portion is pushed by the releasing portion, the arm member rotates the rotating member in the predetermined direction while moving rectilinearly.

In the recording tape cartridge of the fourth aspect of the present invention, when the pushed portion, which is one end portion of the arm member, is pushed by the releasing portion of the drive device, the arm member moves rectilinearly and rotates the rotating member in a predetermined direction. In this way, the state of abutment of the pair of abutment surfaces is cancelled, and the movable member moves to the rising-up permitting position. In this way, in the present recording tape cartridge, the switching section is realized with an even simpler structure.

Moreover, the longitudinal direction of the arm member is a direction substantially orthogonal to the axis of the reel, and the pushed portion is pushed by the releasing portion of the drive device from a peripheral wall side of the case. In other words, the pushed portion is exposed from the case independently of the reel which is driven to rotate around the axis from the exterior of the case. Therefore, the pushed portion does not slidingly contact a part of the drive device as the reel rotates. In the state in which the pushed portion is pushed (the state after the arm member has moved rectilinearly), the switching section, which holds the movable member at the rising-up permitting position by the cam portion and the contact element, does not follow the rotation of the reel. Thus, the rotating member and the movable member (the cam portion and the contact element) do not slidingly contact one another as the reel rotates. (This point is the same as in the third aspect.) Accordingly, in the present recording tape cartridge, great axial direction movement of the reel is prevented, and wear of the respective portions accompanying rotation of the reel is reliably prevented.

In a recording tape cartridge of a fifth aspect of the present invention, the pushed member is exposed at the case toward a side of loading the recording tape cartridge into the drive device, and is pushed by the releasing portion as the recording tape cartridge is loaded into the drive device.

In the recording tape cartridge of the fifth aspect of the present invention, as the recording tape cartridge is loaded into a drive device, the pushed portion is pushed by the releasing portion of the drive device. In this way, the arm member moves straight along the direction of loading into the drive device, and rotates the rotating member. The state of abutment of the pair of abutment surfaces is cancelled, and the movable member moves to the rising-up permitting position. Therefore, in the drive device, it suffices to merely fixedly provide the releasing portion on the locus along which the pushed portion moves due to the loading in of the recording tape cartridge, and the structure of the drive device is simple.

As described above, the recording tape cartridge relating to the present invention has the excellent effect that, when the recording tape cartridge is not being used, it is possible to prevent the reel from moving greatly in the axial direction within the case.

BRIEF DESCRIPTION OF THE DRAWINGS

FIG. 1A is a perspective view in which a recording tape cartridge relating to an embodiment of the present invention is viewed from above.

FIG. 1B is a perspective view in which the recording tape cartridge relating to the embodiment of the present invention is viewed from below.

FIG. 2A is a sectional view, taken along a central line in a direction of loading the recording tape cartridge relating to the embodiment of the present invention into a drive device, and is a sectional view at a time when rotation of a reel is locked.

FIG. 2B is a sectional view, taken along the central line in the direction of loading the recording tape cartridge relating to the embodiment of the present invention into a drive device, and is a sectional view at a time when locking of the rotation of the reel is released.

FIG. 8A is a diagram showing operation of the locking mechanism structuring the recording tape cartridge relating to the embodiment of the present invention, and is a plan view of which a portion is cut-away and which shows a state before pushing by a pushing projection of a drive device.

FIG. 8B is a diagram showing operation of the locking mechanism structuring the recording tape cartridge relating to the embodiment of the present invention, and is a plan view of which a portion is cut-away and which shows a pushing state by the pushing projection of the drive device.

FIG. 9 is an exploded perspective view, as seen from below, showing a modified example of the locking mechanism structuring the recording tape cartridge relating to the embodiment of the present invention.

DETAILED DESCRIPTION OF THE INVENTION

Figure 3A:
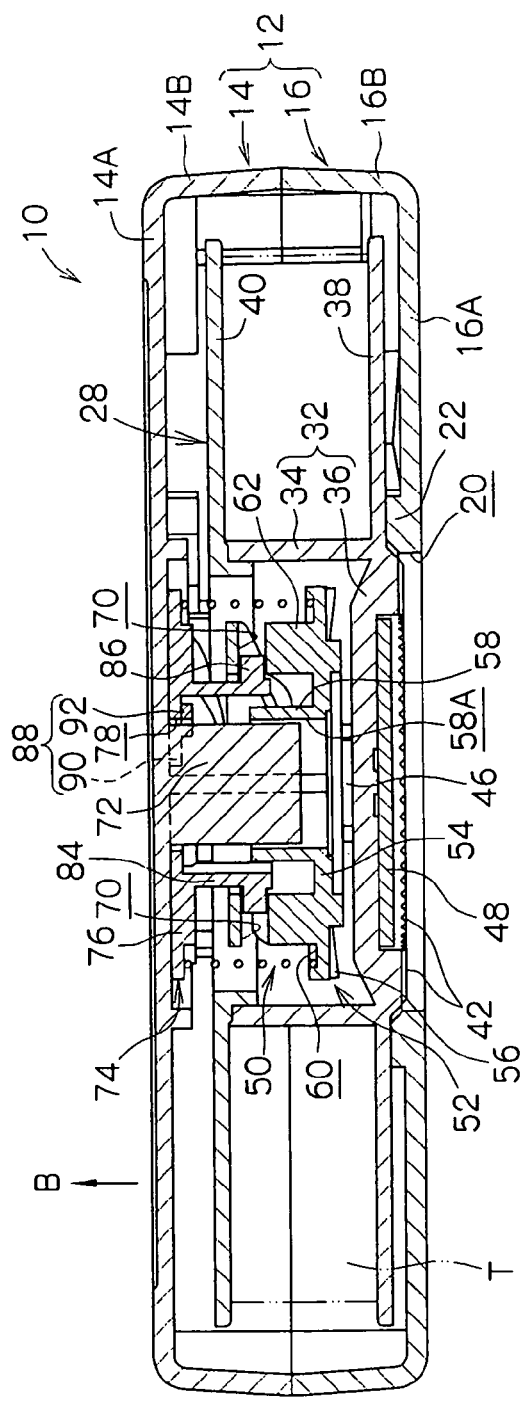
FIG. 3A is a sectional view, taken along a central line orthogonal to the direction of loading the recording tape cartridge relating to the embodiment of the present invention into a drive device, and is a sectional view at a time when rotation of the reel is locked.

A recording tape cartridge 10 relating to an embodiment of the present invention will be described on the basis of FIGS. 1A through 8B.

(Overall Structure of Recording Tape Cartridge)

A perspective view, as seen from above and at an incline, of the recording tape cartridge 10 is shown in FIG. 1A. A perspective view, as seen from below and at an incline, of the recording tape cartridge 10 is shown in FIG. 1B. Sectional views of the recording tape cartridge 10 are shown in FIGS. 2A and 2B. Note that arrow A used appropriately in the respective drawings indicates the direction of loading the recording tape cartridge 10 into a drive device, and for convenience of explanation, the side in the direction of arrow A is the front side. Further, the direction indicated by arrow B is upward.

As shown in these drawings, the recording tape cartridge 10 has a case 12. The case 12 is structured by an upper case 14 and a lower case 16 being joined together. Specifically, the upper case 14 is structured such that a substantially frame-shaped peripheral wall 14B stands erect along the outer edge of a ceiling plate 14A which is substantially rectangular in plan view. The lower case 16 is structured such that a peripheral wall 16B stands erect along the outer edge of a floor plate 16A which has a configuration substantially corresponding to that of the ceiling plate 14A. The case 12 is formed in a substantial box shape by the upper case 14 and the lower case 16 being joined together by ultrasonic welding or screws or the like in a state in which the open end of the peripheral wall 14B and the open end of the peripheral wall 16B abut one another.

At a corner portion of the case 12 at the leading side in the direction of loading the recording tape cartridge 10 into a drive device, the ceiling plate 14A, the peripheral wall 14B, the floor plate 16A and the peripheral wall 16B are respectively cut away, such that an opening 18, which is inclined with respect to the loading direction, is formed. A gear opening 20, which is circular and passes through the floor plate 16A, is formed in the substantially central portion of the floor plate 16A. The gear opening 20 is for exposing a reel gear 42 which will be described later. An annular rib 22 projects toward the inner side of the case 12 at the floor plate 16A at the edge of the gear opening 20, and is for positioning of a reel 28 which will be described later.

A pair of positioning holes 24, 26 are formed in a vicinity of the front end of the outer surface of the floor plate 16A of the case 12. The pair of positioning holes 24, 26 are formed in the shapes of bags within projections (not illustrated) which stand erect from the floor plate 16A toward the interior of the case 12. The positioning holes 24, 26 are disposed so as to be separated from one another on an imaginary line which is orthogonal to the loading direction. The positioning hole 24, which is the positioning hole which is closer to the opening 18, is formed in a substantially square shape, as seen in bottom view, which circumscribes a positioning pin of a drive device. The positioning hole 26 is a long hole whose longitudinal direction runs along the aforementioned imaginary line, and whose width corresponds to the diameter of a positioning pin.

In this way, when the recording tape cartridge 10 is loaded into a drive device and positioning pins are inserted into the respective positioning holes 24, 26, the recording tape cartridge 10 is correctly positioned in the horizontal directions (the left/right direction and the front/back direction) within the drive device.

The portions of the floor plate 16A around the positioning holes 24, 26 are positioning surfaces 24A, 26A which are finished so as to be smoother than the other portions of the floor plate 16A (the design surface of the floor plate 16A). When the positioning pins are inserted into the positioning holes 24, 26, the positioning surfaces 24A, 26A abut positioning surfaces of the drive device which are provided around the positioning pins. In this way, the vertical direction positioning of the recording tape cartridge 10 within the drive device is carried out.

A cut-out portion is formed in the peripheral wall 14B at a portion of the front wall which faces in the direction of arrow A. A window portion 27 is formed in the front surface of the case 12 due to the bottom end of this cut-out portion being closed by the peripheral wall 16B. The window portion 27 is for exposing a release operation portion 104 which will be described later.

As shown in FIGS. 2A and 2B, the reel 28, which will be described in detail later, is rotatably accommodated within the above-described case 12. Only one reel 28 is provided. A magnetic tape T serving as a recording tape is wound on the reel 28. A leader block 30, which serves as a pull-out member, is attached to the distal end of the magnetic tape T.

When the recording tape cartridge 10 is not being used, the leader block 30 is accommodated and held at the inner side of the opening 18 of the case 12. In this state, the leader block 30 closes the opening 18, and impedes entry of dust and the like into the case 12. An engaging recess 30A is formed in the distal end of the leader block 30. When the magnetic tape T is to be pulled-out within the drive device, a pull-out portion, which engages with the engaging recess 30A, pulls the leader block 30 out of the case 12 and guides the leader block 30 to a take-up reel of the drive device. Moreover, the end surface of the leader block 30 at the side opposite the engaging recess 30A is an arc-shaped surface 30B. The arc-shaped surface 30B is fit into the take-up reel and forms a portion of the take-up surface around which the magnetic tape T is taken-up.

(Structure of Reel and the Like)

Next, the reel 28 will be described. As shown in FIGS. 2A, 2B, 3A and 3B, the reel 28 has a reel hub 32 which serves as a hub and which structures the axially central portion of the reel 28. The reel hub 32 is formed substantially in the shape of a hollow cylinder having a floor, and has a cylindrical portion 34 around whose outer peripheral surface the magnetic tape T is wound, and a floor portion 36 which closes the bottom portion of the cylindrical portion 34. A lower flange 38 extends coaxially and integrally at the radial direction outer side of the reel hub 32 from a vicinity of the floor portion 36 side end portion (i.e., the lower end portion) of the reel hub 32.

On the other hand, an upper flange 40, which is formed in correspondence with the lower flange 38, is joined to the upper end portion of the reel hub 32. In this way, at the reel 28, the magnetic tape T is wound around the outer peripheral surface of the cylindrical portion 34 of the reel hub 32, between the opposing surfaces of the lower flange 38 and the upper flange 40, and the cylindrical portion 34 is open toward the top.

The reel gear 42 is formed on the whole in the shape of a ring which is coaxial with the reel 28, at the bottom end surface of the floor portion 36 of the reel hub 32 (i.e., the outer surface which is positioned further downward than the lower flange 38). The reel gear 42 can mesh with a driving gear 124 (see FIGS. 2A and 2B) which is provided in an annular form at the outer peripheral portion of the distal end of a rotating shaft 122 of a drive device.

An engaging gear 44, which serves as an engaging portion, is provided in a vicinity of the outer periphery of the top surface (the inner surface) of the floor portion 36 of the reel hub 32. The engaging gear 44 is formed on a plurality (three in the present embodiment) of arc-shaped convex portions 46 which project at uniform intervals along a circumference which is coaxial with the reel 28. The engaging gear 44 can mesh with a braking gear 56 of a braking member 52 which will be described later. Note that the engaging gear 44 may be formed, in the same way as the reel gear 42, on the whole in the form of a ring which is coaxial with the reel 28, or may be divided into a plural number of portions, other than three portions, which are disposed on a coaxial circumference.

The portions of the above-described reel 28, other than the upper flange 40, are formed integrally by resin molding. A reel plate 48, which is formed of a magnetic material and in the shape of a disc, is provided integrally and coaxially by insert molding at the inner side of the reel gear 42 at the bottom surface of the floor portion 36 of the reel hub 32. The reel plate 48 is for attraction and holding (chucking) by a magnet 126 which is provided at the rotating shaft 122 at the radial direction inner side of the driving gear 124.

The reel 28 is accommodated in the case 12, and when the recording tape cartridge 10 is not in use, the reel 28 is set on the annular rib 22. Specifically, as shown in FIGS. 2A and 3A, the portion of the reel 28, which portion is the border between the floor portion 36 and the lower flange 38, abuts the top end surface of the annular rib 22. Due to the portion of the reel 28 which projects further than the lower flange 38 being set in at the inner side of the annular rib 22, radial direction movement of the reel 28 is restricted. In the present embodiment, the top end surface of the annular rib 22 corresponds to the "floor plate inner surface" of the case 12.

In this state, the reel 28, on the whole, is positioned within the case 12, and the reel gear 42 and the reel plate 48 are exposed from the gear opening 20 (see FIG. 1B). Namely, the reel gear 42 faces the exterior of the case 12 from the gear opening 20, without projecting out from the outer surface (the bottom surface) of the floor plate 16A. In this way, operation, i.e., chucking (holding) and driving/rotating, of the reel 28 from the exterior of the case 12 is possible.

(Structure of Lock Mechanism)

The recording tape cartridge 10 is provided with a lock mechanism 50 which, when the magnetic tape T is not being used, restricts axial direction movement of the reel 28 and impedes rotation of the reel 28 with respect to the case 12, and which, when the recording tape cartridge 10 is loaded in a drive device, permits rising-up and rotation of the reel 28 with respect to the case 12. The structure of the lock mechanism 50 will be described in detail hereinafter.

Figure 3B:
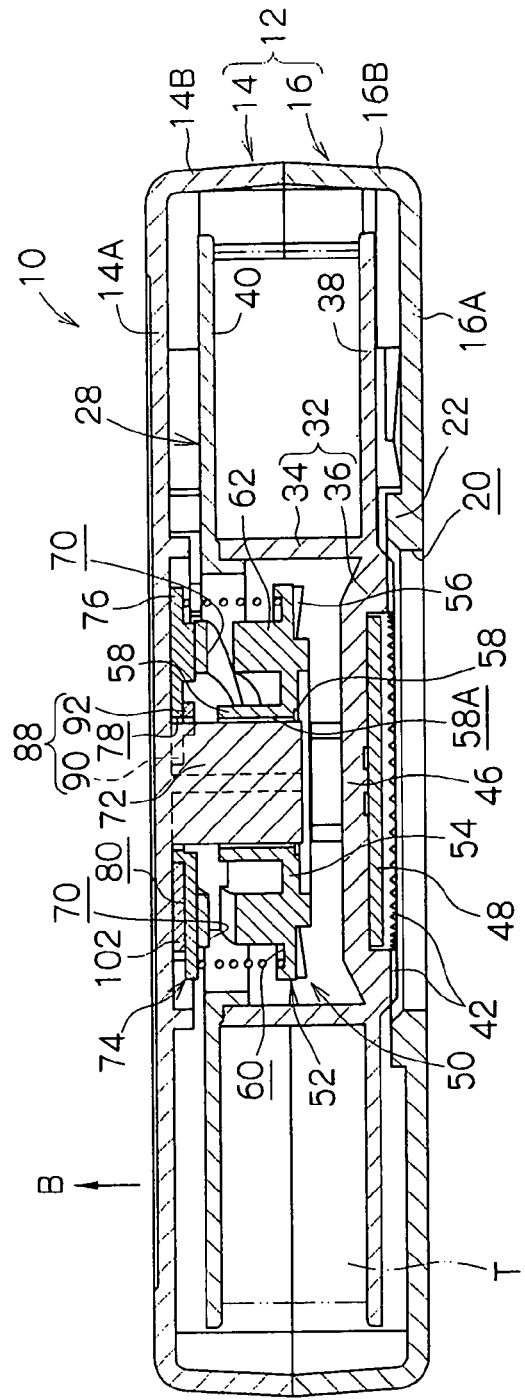
FIG. 3B is a sectional view, taken along the central line orthogonal to the direction of loading the recording tape cartridge relating to the embodiment of the present invention into a drive device, and is a sectional view at a time when locking of the rotation of the reel is released.
Figure 4:
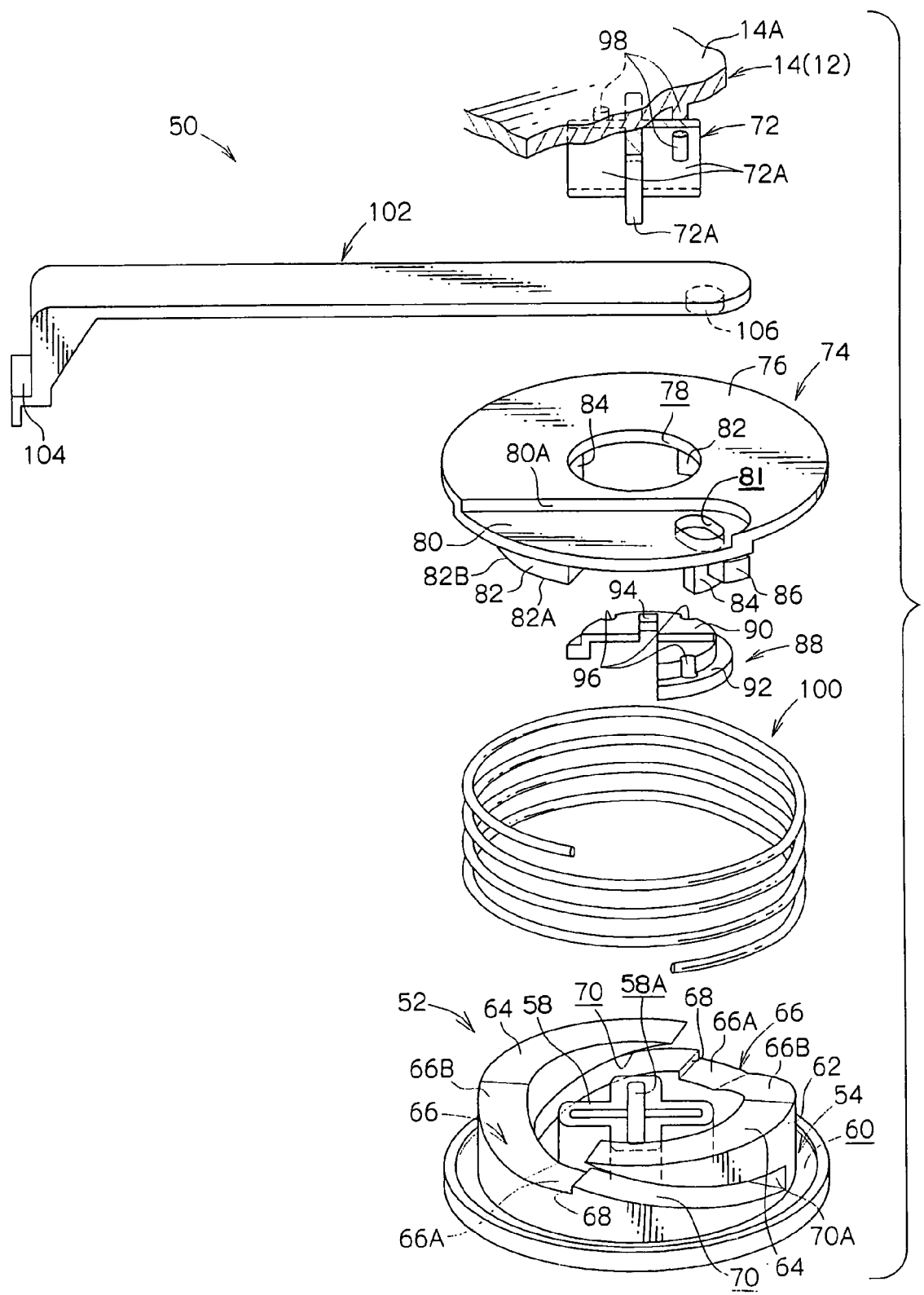
FIG. 4 is an exploded perspective view, as seen from above, of a locking mechanism structuring the recording tape cartridge relating to the embodiment of the present invention.
Figure 5:
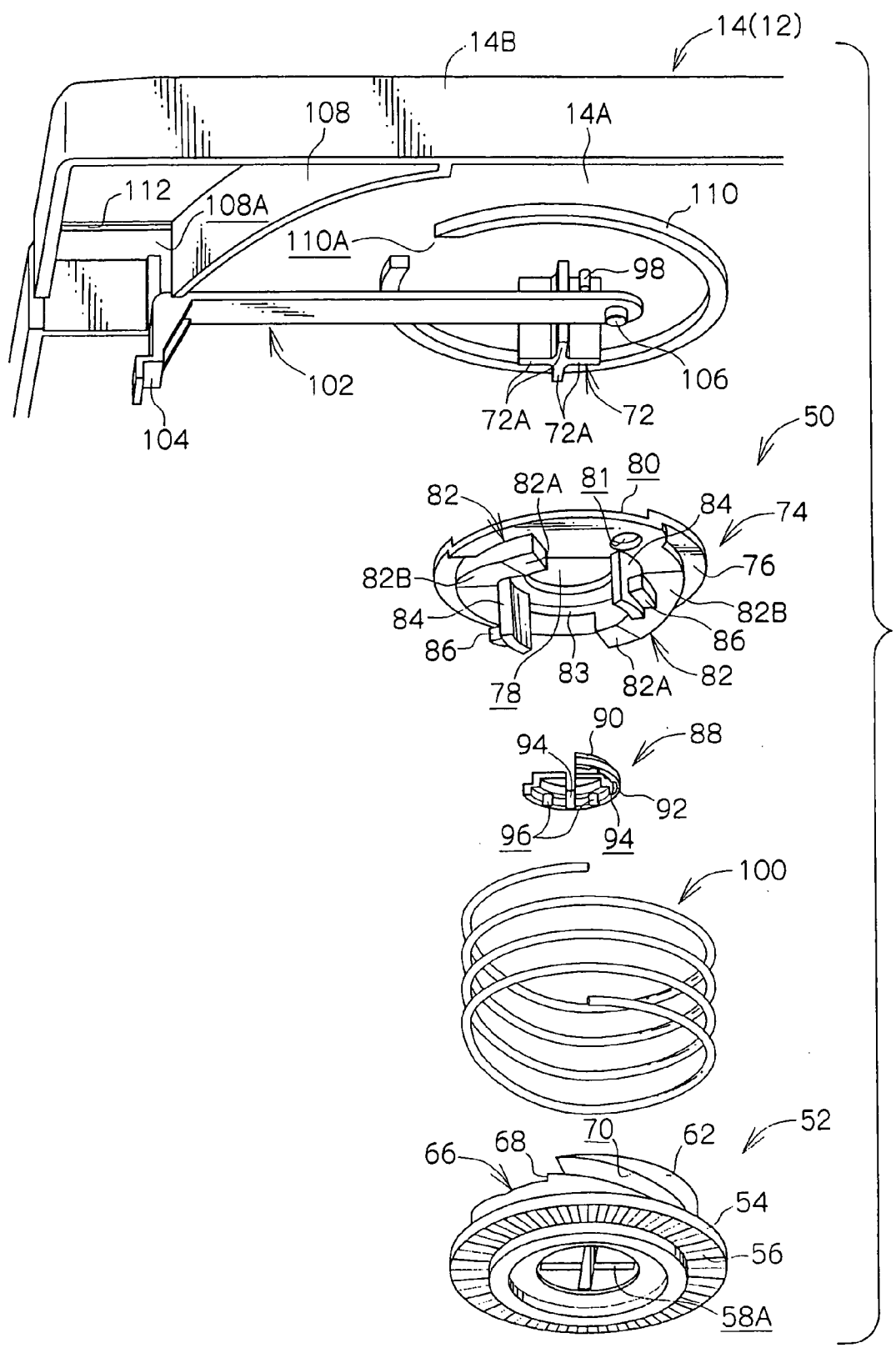
FIG. 5 is an exploded perspective view, as seen from below, of the locking mechanism structuring the recording tape cartridge relating to the embodiment of the present invention.

As shown in FIGS. 2A and 2B and in FIGS. 3A and 3B, the lock #mechanism 50 has the braking member 52 which serves as a movable member. The braking member 52 is inserted within the cylindrical portion 34 of the reel hub 32. As shown in FIGS. 4 and 5, the braking member 52 has a disc portion 54 which is formed substantially in the shape of a disc. The braking gear 56, which can mesh with the engaging gear 44, is provided in an annular form at the outer peripheral portion of the bottom surface of the disc portion 54.

As shown in FIGS. 2A and 2B, the braking member 52 has a cross-shaped projection 58 which is substantially cross-shaped as seen in plan view and which stands erect from the axially central portion of the top surface of the disc portion 54. An insertion groove 58A, which is of a configuration corresponding to the cross-shaped projection 58, is formed at the interior of the cross-shaped projection 58. The insertion groove 58A also passes through the disc portion 54 in the direction of plate thickness thereof. A spring receiving recess 60, which is surrounded by a wall which is annular in plan view, is formed in the vicinity of the outer periphery of the top surface of the disc portion 54.

A tubular wall 62 stands erect at the top surface of the disc portion 54, from between the cross-shaped projection 58 and the spring receiving recess 60. In the present embodiment, the tubular wall 62 is formed in the shape of a short tube which is coaxial with the disc portion 54. Concave portions 66, which are recessed further downwardly than top end portions 64 which serve as abutment surfaces and which are substantially orthogonal to the axis of the tubular wall 62, are formed at two axially symmetrical places of the tubular wall 62. The floor surface of each concave portion 66 is structured by a flat floor surface 66A which is parallel to the top end surface 64, and an inclined surface 66B which connects the flat floor surface 66A and the top end surface 64 without a step therebetween. The border between the top end surface 64 and the flat floor surface 66A is a step portion 68.

Cam grooves 70 serving as cam portions are formed in the tubular wall 62. Two of the cam grooves 70 are provided by cutting out the tube walls of portions in the peripheral direction of the tubular wall 62 where the concave portions 66 are not formed. The cam grooves 70 are axially symmetrical with respect to one another. A proximal end 70A of each of the cam grooves 70 is, in the axial direction, in a vicinity of the disc portion 54 (the "root" portion of the tubular wall 62) and is, in the peripheral direction, in a vicinity of the border between the top end surface 64 and the inclined surface 66B. Each cam groove 70 is inclined with respect to the axis of the braking member 52 from the proximal end 70A toward the upper side, and opens to the step portion 68 and the top end surface 64 at the final end thereof. Accordingly, at the step portion 68, only the portion from the flat floor surface 66A to the bottom edge of the cam groove 70 remains.

The respective portions of the above-described braking member 54 are formed integrally by resin molding. The braking member 52 is inserted within the cylindrical portion 34 of the reel hub 32 so as to be substantially coaxial and so as to be able to move in vertical directions (i.e., in the axial direction of the reel 28). Namely, due to the braking member 52 moving in vertical directions, the braking member 52 can be set at a position where the braking gear 56 of the braking member 52 meshes with the engaging gear 44 provided at the reel hub 32 (a rotation locking position which is also a restricting position and which is shown in FIGS. 2A and 3A), and a position where this meshing is released (a rotation permitting position which is also a rising permitting position and which is shown in FIGS. 2B and 3B).

A cross-shaped rib 72, which projects downward from the ceiling plate 14A of the case 12, is inserted in the insertion groove 58A of the cross-shaped projection 58 of the braking member 52. Due to the engagement of the cross-shaped projection 58 (the groove walls of the insertion groove 58A) and the cross-shaped rib 72, rotation of the braking member 52 with respect to the case 12 is impeded.

In this way, in the state in which the braking member 52 is positioned at the rotation locking position and the braking gear 56 meshes with the engaging gear 44 of the reel hub 32, the braking member 52 impedes rotation of the reel 28. Note that the state in which the cross-shaped rib 72 is inserted in the insertion groove 58A is maintained over the entire stroke of movement of the braking member 52 in the vertical direction, such that the cross-shaped rib 72 also functions to guide the direction of movement of the braking member 52 in the vertical direction.

The lock mechanism 50 has a clutch member 74, which serves as a rotating member, in order to switch the braking member 52 between the state in which the braking member 52 is positioned at the rotation locking position and the state in which the braking member 52 is positioned at the rotation permitting position. As shown in FIGS. 4 and 5, the clutch member 74 has a main body portion 76 which is formed substantially in the shape of a disc. A through hole 78 is formed in the axially central portion of the main body portion 76. The through hole 78 is formed such that the cross-shaped rib 72 of the case 12 is inserted therethrough, without the through hole 78 interfering with the cross-shaped rib 72.

A stepped recess 80 is formed in the main body portion 76 at the outer side of the through hole 78. The stepped recess 80 is recessed downward such that the longitudinal direction of a step portion 80A (see FIG. 4) is parallel to a predetermined center line, and such that the step portion 80A intersects a center line which is orthogonal to the aforementioned center line. The stepped recess 80 is provided at the outer side of the step portion 80A up to the outer edge of the main body portion 76, and is for relief of an arm member 102 which will be described later. A connection hole 81, which is for connecting the arm member 102, is provided in a vicinity of the end portion of the stepped recess 80, which end portion is rounded and closed in the longitudinal direction. The connection hole 81 is a long hole whose longitudinal direction runs along the radial direction of the main body portion 76.

Convex portions 82, which are formed in configurations corresponding to the concave portions 66 of the braking member 52, project from two places, which are symmetrical across the axial center, of the bottom surface of the main body portion 76 which includes the stepped recess 80. Namely, the bottom surface of each convex portion 82 is structured by a bottom end surface 82A, which serves as an abutment surface which corresponds to the flat floor surface 66A and which is a surface substantially orthogonal to the axial direction of the clutch member 74, and an inclined surface 82B, which corresponds to the inclined surface 66B and is inclined with respect to the axial direction of the clutch member 74. Note that an arc-shaped convex portion 83, whose height coincides with the bottom surface of the stepped recess 80, is formed at the portions other than the stepped recess 80 between the convex portions 82.

Leg pieces 84 project from between the convex portions 82 in the peripheral direction of the bottom surface of the main body portion 76. The leg pieces 84 are formed in the shapes of arcs which are coaxial with the main body portion 76 and whose outer diameters are slightly smaller than the inner diameter of the tubular wall 62. Cam projections 86, which serve as contact elements, project from the outer surfaces of the leg pieces 84. Each cam projection 86 is formed in the shape of a small block which is inclined with respect to the axis of the main body portion 76 in correspondence with the angle of inclination of the cam groove 70. The cam projections 86 are formed and disposed symmetrically with respect to the axis of the main body portion 76, and fit into the respectively different cam grooves 70, so as to, together with the cam grooves 70, structure a positive motion cam mechanism.

The clutch member 74 is supported so as to be rotatable with respect to the case 12 by a stopper member 88 which is fixed to the case 12. The stopper member 88 is structured so as to have a fit-together portion 90 which fits-together with the through hole 78, and a flange portion 92 which extends outwardly in the radial direction from the bottom end of the fit-together portion 90. The stopper member 88 is formed, on the whole, as if a substantially 90° fan-shaped portion were cut-out from a circle as seen in plan view, so as to not interfere with the stepped recess 80 when the clutch member 74 rotates.

A cut-out 94 corresponding to the cross-shaped rib 72 is formed in the stopper member 88 from the fit-together portion 90 to the inner edge portion of the flange portion 92. The top end surface of the fit-together portion 90 abuts the ceiling plate 14A in a state in which the cross-shaped rib 72 is fit in the cut-out 94. A plurality (three in the present embodiment) of holes 96 for caulking are provided in the stopper member 88 from the outer edge portion of the fit-together portion 90 to the inner edge portion of the flange portion 92. Projections 98 for caulking, which are formed at the ceiling plate 14A so as to project from between respective leg pieces 72A of the cross-shaped rib 72 (see FIGS. 4 and 5), are inserted through these holes 96 for caulking.

The stopper member 88 is fixed to the case 12 due to the distal ends of the projections 98 for caulking, which have been inserted through the holes 96 for caulking, being caulked. In this state, due to the flange portion 92 abutting the bottom surface of the main body portion 76 of the clutch member 74 around the through hole 78, rotation of the clutch member 74 around the fit-together portion 90 with respect to the case 12 is permitted, and axial direction movement of the clutch member 74 is impeded.

Due to the cam projections 86 being disposed in the cam grooves 70 of the braking member 52, the above-described clutch member 74 is connected substantially coaxially to the braking member 52 and so as to be able to rotate relative to the braking member 52. Further, in this state, a compression coil spring 100 is disposed between the clutch member 74 (the ceiling plate 14A) and the braking member 52. The braking member 52 is always urged downward by the urging force of the compression coil spring 100. One end portion of the compression coil spring 100 abuts the spring receiving recess 60 of the braking member 52, whereas the other end portion of the compression coil spring 100 abuts a vicinity of the outer periphery of the bottom surface of the main body portion 76 of the clutch member 74.

Figure 6:
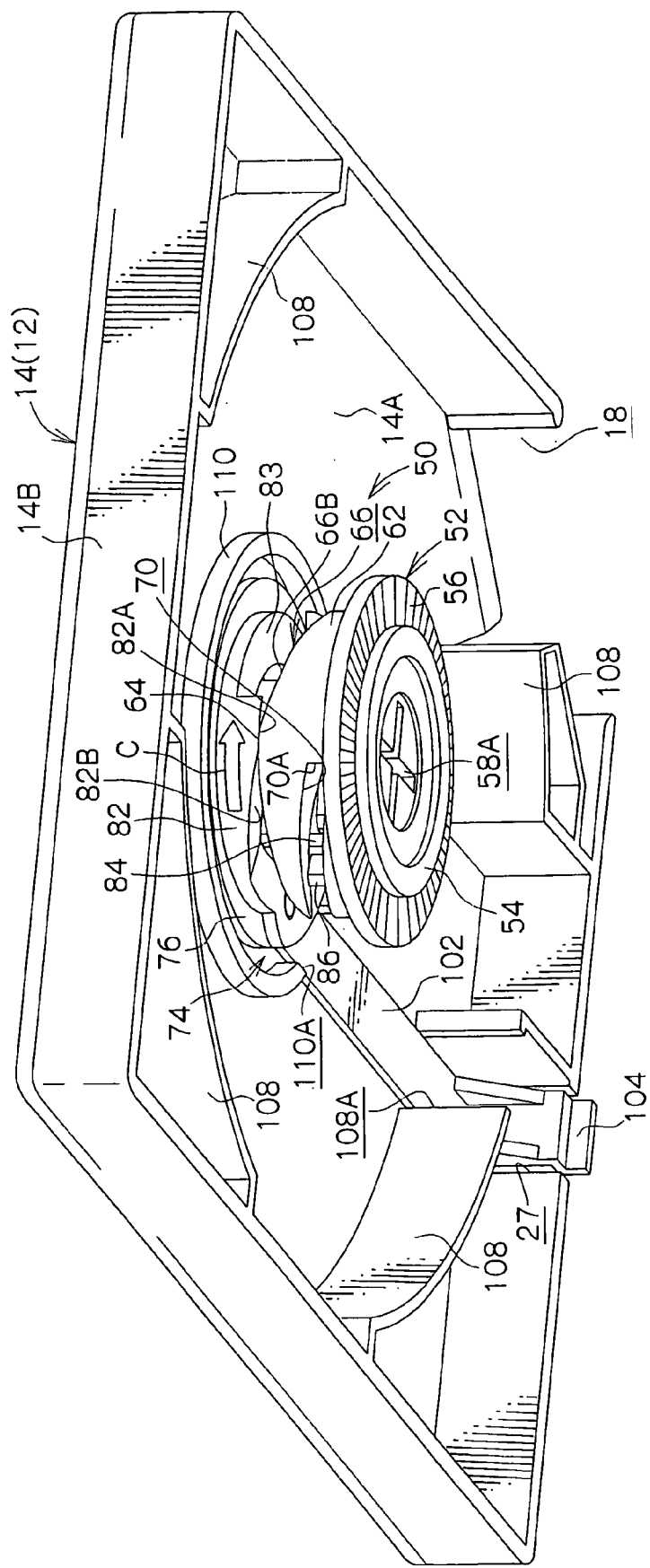
FIG. 6 is a perspective view, as seen from below, of a state in which a braking member of the locking mechanism structuring the recording tape cartridge relating to the embodiment of the present invention, is positioned at a rotation locking position.

When the braking member 52 is positioned at the rotation locking position, as shown in FIG. 6, the bottom end surfaces 82A of the clutch member 74 abut the top end surfaces 64 of the braking member 52 (or, the bottom end surfaces 82A abut the top end surfaces 64 due to the braking member 52 being raised over a distance which is sufficiently small with respect to the amount of meshing of the engaging gear 44 and the braking gear 56). In this way, even if the braking member 52 is pushed in the axial direction from below (via the reel 28), the braking member 52 does not move upward from the rotation locking position, and the rotation locked state of the reel 28 is maintained. In this state, the cam projections 86 are positioned in vicinities of the step portion 68 side open ends of the cam grooves 70.

In the present embodiment, not only is the axial direction movement of the reel 28 restricted (impeded) due to the abutment of the top end surfaces 64 and the bottom end surfaces 82A, but also, due to the urging force of the compression coil spring 100 (the force converted to the axial direction by the cam grooves 70 and the cam projections 86), the braking member 52 whose braking gear 56 is meshing with the engaging gear 44 presses the reel 28 against the annular rib 22, such that joggling of the reel 28 is reliably prevented. Note that a stopper portion may be provided between, for example, the clutch member 74 and the braking member 52, or between the clutch member 74 and the arm member 102 (which will be described later), or between the case 12 and the clutch member 74 or the arm member 102, and when the braking member 52 is positioned at the rotation locking position, the urging force of the compression coil spring 100 may be supported at the stopper portion such that the urging force of the compression coil spring 100 does not act on the reel 28.

On the other hand, when the clutch member 74 rotates around its axis in the direction of moving the cam projections 86 toward the proximal end 70A sides of the cam grooves 70 (i.e., in the direction of arrow C in FIGS. 6 and 8A), the bottom end surfaces 82A of the clutch member 74 slide along the top end surfaces 64 of the braking member 52. When the bottom end surfaces 82A reach the concave portions 66, the state in which upward movement of the braking member 52 is impeded is released. Moreover, accompanying the aforementioned rotation, the clutch member 74 converts (a portion of) the torque into force for moving the braking member 52 upward, due to the cam projections 86 working in cooperation with the corresponding cam grooves 70 while sliding along the cam grooves 70. The braking member 52 moves upward against the urging force of the compression coil spring 100, and when the peripheral direction end surfaces of the convex portions 82 engage with the step portions 68, the braking member 52 reaches the rotation permitting position.

Figure 7:
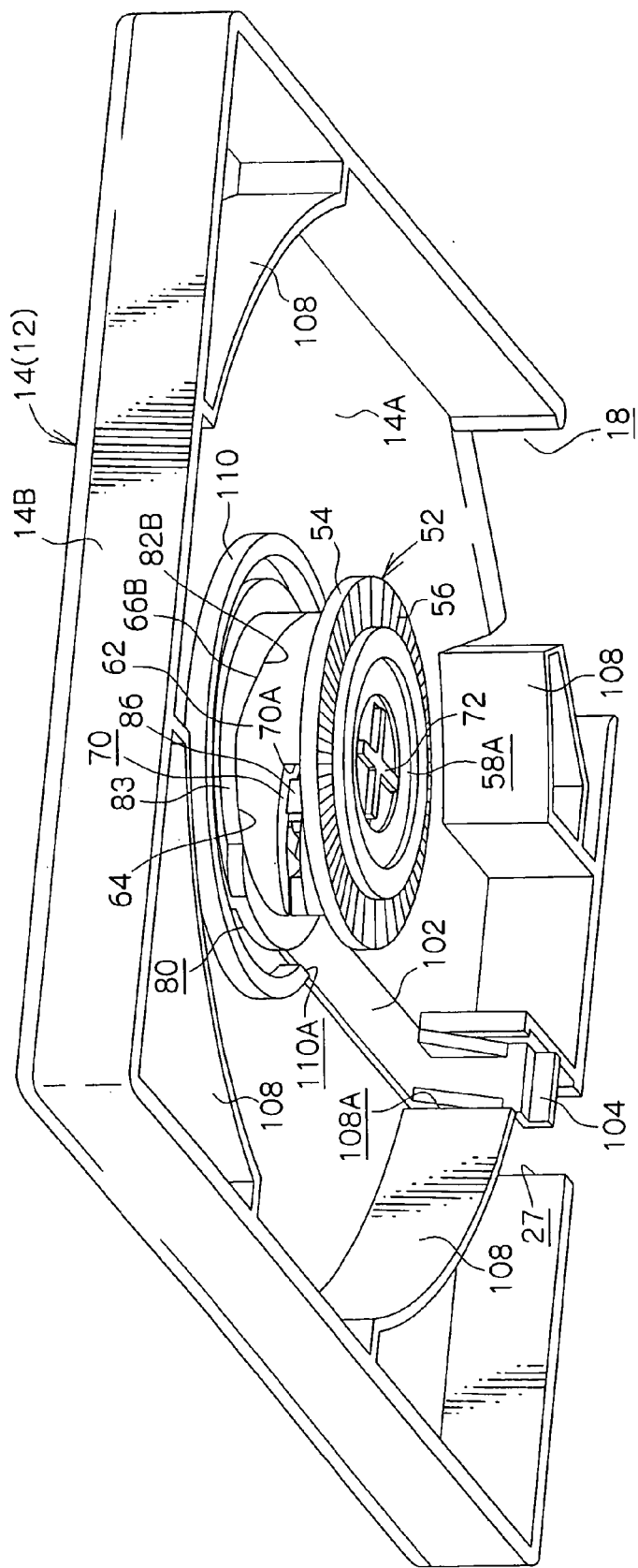
FIG. 7 is a perspective view, as seen from below, of a state in which the braking member of the locking mechanism structuring the recording tape cartridge relating to the embodiment of the present invention, is positioned at a rotation permitting position.

In this state, as shown in FIG. 7, the convex portions 82 of the clutch member 74 are disposed in the concave portions 66 of the braking member 52, and the bottom end surfaces 82A and the inclined surfaces 82B abut the flat floor surfaces 66A and the inclined surfaces 66B, respectively. Further, in this state, the bottom surface of the stepped recess 80 and the bottom surface of the arc-shaped convex portion 83 abut the top end surfaces 64 of the braking member 52, respectively.

The lock mechanism 50 has the arm member 102 for rotating the clutch member 74 around the axial center thereof. As shown in FIGS. 4 and 5, the arm member 102 is formed in the shape of an elongated plate. One end portion thereof which is bent downward is the release operation portion 104 which serves as a pushed portion. A connecting projection 106, which is circular in bottom view, projects from the bottom surface of the other end portion of the arm member 102. The connecting projection 106 is inserted (fit with play) in the connection hole 81 of the clutch member 74, so as to be angularly displaceable and so as to be slidable in the longitudinal direction of the connection hole 81.

As shown in FIGS. 8A and 8B, the longitudinal direction of the above-described arm member 102 runs along the direction of arrow A, in the state in which the release operation portion 104 is exposed from the window portion 27 of the case 12 and the connecting projection 106 is inserted in the connection hole 81 of the clutch member 74.

A play restricting wall 108, which stands erect from the ceiling plate 14A coaxially with the gear opening 20, and an annular rib 110, which projects from the ceiling plate 14A at the radial direction outer side of the clutch member 74, are provided at the upper case 14 in order to restrict radial direction movement of the reel 28 within the case 12. As shown in FIGS. 6 and 7, guide portions 108A, 110A for guiding the direction of movement of the arm member 102 in the longitudinal direction (the direction of arrow A) are formed by cutting out respective portions of the play restricting wall 108 and the annular rib 110 up to the ceiling plate 14A. A guide wall 112, which stands erect from the ceiling plate 14A and which reaches the peripheral wall 14B facing the front side and which is short (i.e., having a height of about the plate thickness of the arm member 102), is provided continuously with the guide portion 108A (see FIGS. 8A and 8B).

Note that the cut-out portion forming the guide portion 108A of the play restricting wall 108, which also functions to prevent the entry of dust into the space in the case 12 where the reel 28 is disposed, is closed by a blocking piece which projects from a play restricting wall of the lower case 16 (neither the blocking piece nor this play restricting wall is illustrated), except for at the region where the arm member 102 passes through.

When the braking member 52 is positioned at the rotation locking position, as shown in FIG. 8A, the connecting projection 106 of the arm member 102 is positioned further toward the front side than the central line of the clutch member 74 which is orthogonal to the direction of arrow A. When the braking member 52 is positioned at the rotation permitting position, as shown in FIG. 8B, the connecting projection 106 of the arm member 102 is positioned further toward the rear than the aforementioned central line of the clutch member 74. Because the connection hole 81 into which the connecting projection 106 is inserted is a long hole, the connecting projection 106 of the arm member 102, which moves rectilinearly and reciprocatingly along the direction of arrow A, can move between positions at both sides of the aforementioned central line.

The arm member 102 is disposed (the length thereof is set) such that, when the braking member 52 is positioned at the rotation locking position, the release operation portion 104 is substantially flush with (the outer surface of the peripheral wall 14B which structures) the front surface of the case 12. On the other hand, when the braking member 52 is positioned at the rotation permitting position, the step portion 80A of the stepped recess 80 of the clutch member 74 runs along the longitudinal direction of the arm member 102.

In the above-described lock mechanism 50, when the release operation portion 104, which is exposed to the exterior of the case 12 at the time when the braking member 52 is positioned at the rotation locking position, is pushed in the direction opposite to the direction of arrow A, the arm member 102 moves rectilinearly in the direction opposite to the direction of arrow A, and rotates the clutch member 74 in the direction of arrow C. In this way, the state of abutment of the top end surfaces 64 and the bottom end surfaces 82A is cancelled, the cam projections 86 slide within the cam grooves 70 toward the proximal end 70A sides, the torque of the clutch member 74 is converted into force for moving the braking member 52 upward, and the braking member 52 is moved to the rotation permitting position.

On the other hand, at the locking mechanism 50, when the pushed state of the release operation portion 104 is cancelled (i.e., when the force resisting the urging force of the compression coil spring 100 ceases to exist), due to the urging force of the compression coil spring 100, the clutch member 74 is rotated in the direction of arrow D shown in FIG. 8B while the cam projections 86 slide within the cam grooves 70 in directions of moving away from the proximal ends 70A, and the braking member 52 is returned to the rotation locking position.

As the recording tape cartridge is loaded into a drive device along the direction of arrow A, the release operation portion 104, which is exposed from the front surface of the case 12, is pushed in the direction opposite to the direction of arrow A by a pushing projection 120 disposed in the drive device on the locus of movement of the release operation portion 104.

Note that, in the lock mechanism 50 having the above-described structure, the tubular wall 62 of the braking member 52 (the top end surfaces 64, the cam grooves 70), the clutch member 74 (the bottom end surfaces 82A, the cam projections 86), the arm member 102 (the release operation portion 104), and the compression coil spring 100 correspond to the "switching section" of the present invention.

In accordance with the above-described structure, in the state in which the pushing projection 120 abuts the release operation portion 104, the urging force of the compression coil spring 100 is supported. In the recording tape cartridge 10, at the time when the reel 28 is driven to rotate, the urging force of the compression coil spring 100 is not applied to the reel 28. Therefore, it is preferable that the force by which the reel plate 48 is attracted by the magnet 126 of the rotating shaft 122 is set to be large in order for the reel gear 42 and the driving gear 124 of the rotating shaft 122 to mesh together in the state in which the reel 28 is reliably chucked by the rotating shaft 122 which structures the drive device. Further, it is preferable to prevent the application of thrust in the direction of moving the reel 28 and the rotating shaft 122 apart from one another as the reel 28 is driven to rotate, by forming the meshed-together surfaces of the reel gear 42 and the driving gear 124 to be substantially parallel to the axis of rotation of the reel 28.

Next, operation of the present embodiment will be described.

At the recording tape cartridge 10 having the above-described structure, when the magnetic tape T is not in use, due to the top end surfaces 64 of the braking member 52 abutting the bottom end surfaces 82A of the clutch member 74, the braking member 52 is positioned at the rotation locking position, and the braking gear 56 meshes with the engaging gear 44. Therefore, rotation of the reel 28 with respect to the case 12 is impeded, movement of the reel 28 in the axial direction is restricted, and the reel 28 hardly joggles at all within the case 12. Further, in the present embodiment, the braking member 52 is pushed against the reel 28 by the urging force of the compression coil spring 100, and the reel 28 is pushed against the case 12 (the annular rib 22). Therefore, joggling of the reel 28 is markedly suppressed. At this time, the reel gear 42 of the reel 28 is exposed from the gear opening 20, and the release operation portion 104 of the arm member 102 is exposed from the window portion 27. Further, the opening 18 is closed by the leader block 30.

On the other hand, when the magnetic tape T is to be used, the recording tape cartridge 10 is loaded into a bucket (not illustrated) of the drive device along the direction of arrow A. Accompanying this loading operation, the release operation portion 104 is pushed in the direction opposite to the direction of arrow A while in a state of abutting the pushing projection 120 of the drive device (see FIGS. 8A and 8B). Thus, the arm member 102 rotates the clutch member 74 in the direction of arrow C while moving straight in the direction opposite to the direction of arrow A.

Due to this rotation, the bottom end surfaces 82A of the clutch member 74 slide along the top end surfaces 64 of the braking member 52, the state of abutment of the bottom end surfaces 82A and the top end surfaces 64 is released, and the cam projections 86 slide within the corresponding cam grooves 70 toward the proximal end 70A sides thereof. Due to the cam projections 86 sliding along the cam grooves 70 which are inclined with respect to the axis of the braking member 52, the torque of the clutch member 74 is converted into upwardly moving force of the braking member 52, and the braking member 52 is moved away from the floor portion 36 of the reel hub 32 against the urging force of the compression coil spring 100.

When the bottom end surface 82A side end surfaces of the convex portions 82 in the peripheral direction of the clutch member 74 engage with the step portions 68 of the braking member 52, the braking member 52 reaches the rotation permitting position. In this state, meshing of the braking gear 56 of the braking member 52 with the engaging gear 44 of the reel 28 is cancelled, and the braking gear 56 is moved away sufficiently from the engaging gear 44. Further, in this state, the recording tape cartridge 10 is loaded to a predetermined depth within the bucket, and further movement thereof in the direction of arrow A (further movement relative to the pushing projection 120) is impeded.

The bucket is lowered while the state in which the pushing projection 120 abuts the release operation portion 104, i.e., the braking member 52 is held at its rotation permitting position, is maintained. Thus, the rotating shaft 122 of the drive device relatively approaches the gear opening 20 of the case 12 (relatively moves upward) and holds the reel 28. Specifically, the driving gear 124 of the rotating shaft 122 meshes with the reel gear 42 while the reel plate 48 is attracted and held by the magnet 126 without being contacted by the magnet 126.

When the rotating shaft 122 relatively moves further upward, the reel 28 is raised upward and moves apart from the annular rib 22. The amount by which the reel 28 rises up within the case 12 is sufficiently smaller than the amount by which the braking member 52 moves upward, and the engaging gear 44 does not interfere with the braking gear 56 due to this rising-up. In this way, the reel 28 rises up within the case 12 and becomes able to rotate in a state of not contacting the inner surfaces of the case 12.

Due to the bucket, i.e., the recording tape cartridge 10, being lowered within the drive device, the positioning pins of the drive device respectively enter into the positioning holes 24, 26 of the case 12, and the positioning surfaces of the drive device abut the positioning surfaces 24A, 26A of the case 12. The recording tape cartridge 10 is thereby positioned in the horizontal directions and in the vertical direction with respect to the drive device.

Thus, while a pull-out pin (not illustrated) of the pull-out portion of the drive device engages with the engaging recess 30A of the leader block 30, the pull-out portion pulls the leader block 30 out from the case 12 and guides the leader block 30 to the take-up reel of the drive device. The leader block 30 is fit into the take-up reel such that the arc-shaped surface 30B structures a portion of the take-up surface around which the magnetic tape T is taken-up.

In this state, when the leader block 30 rotates integrally with the take-up reel, the magnetic tape T is pulled-out from the case 12 through the opening 18 while being taken-up onto the reel hub of the take-up reel. At this time, the reel 28 of the recording tape cartridge 10 rotates synchronously with the take-up reel, due to the torque of the rotating shaft 122 which is transmitted by the driving gear 124 which meshes with the reel gear 42. Information is recorded onto the magnetic tape T or information recorded on the magnetic tape T is played back by a recording/playback head disposed along a predetermined tape path of the drive device.

When the magnetic tape T is rewound onto the reel 28 and the leader block 30 is held in a vicinity of the opening 18 of the case 12, the bucket in which the recording tape cartridge 10 is loaded is raised. Thus, the meshing of the reel gear 42 and the driving gear 124 is cancelled. In this way, the reel 28 returns to its initial position at which the meshing of the reel gear 42 with the driving gear 124 is cancelled and the reel 28 is set on the annular rib 22. When the bucket rises by a predetermined amount, the recording tape cartridge 10 is ejected from the bucket in the direction opposite to the direction of arrow A.

Accompanying this ejecting, it is no longer possible for the pushing projection 120 to resist the torque of the clutch member 74 which is based on the urging force of the compression coil spring 100 (i.e., it is no longer possible for the pushing projection 120 to support a reaction force which is in equilibrium with this torque). Therefore, due to the urging force of the compression coil spring 100 which is applied in the axial direction of the reel, the cam projections 86 slide within the cam grooves 70 in directions of moving away from the proximal ends 70A. Thus, the clutch member 74, while rotating in the direction of arrow D, moves the braking member 52 downward and moves the arm member 102 straight in the direction of arrow A.

Then, when the braking gear 56 of the braking member 52 meshes with the engaging gear 44 of the reel 28 and the braking member 52 returns to the rotation locking position, further movement or rotation of the respective members is restricted. Namely, in this state, the bottom end surfaces 82A of the clutch member 74 abut the top end surfaces 64 of the braking member 52 which is positioned at the rotation locking position, and the release operation portion 104 of the arm member 102 is exposed from the window portion 27, and the respective portions are returned to their initial states (the state in which the recording tape cartridge 10 is not being used, in which state rotation and axial direction movement of the reel 28 are restricted). In this state, the recording tape cartridge 10 is completely discharged from the bucket.

Here, when the recording tape cartridge 10 is not in use, the bottom end surfaces 82A of the clutch member 74 abut the top end surfaces 64 of the braking member 52, and the clutch member 74 holds the braking member 52 at its rotation locking position. Therefore, axial direction movement of the reel 28 is restricted (impeded). As a result, even if the reel plate 48 or the like which is exposed to the exterior of the case 12 were to be pushed upward when the recording tape cartridge 10 was not in use, or even if the impact of a drop were to be applied, great joggling of the reel 28 within the case 12 could be prevented.

In this way, in the recording tape cartridge 10 relating to the present embodiment, it is possible to prevent the reel 28 from moving greatly in the axial direction within the case 12 at times when the recording tape cartridge 10 is not in use. The magnetic tape T, which is wound around the reel 28 and whose end portion is held at the case 12 via the leader block 30, is thereby protected.

Further, the movable member, which prevents joggling of the reel 28 when the recording tape cartridge 10 is not in use, is the braking member 52 which impedes rotation of the reel 28 with respect to the case 12 when the recording tape cartridge 10 is not in use. In other words, the braking member 52 also serves as the movable member. Therefore, it is possible to realize a structure in which the reel 28 is prevented from joggling within the case 12 when the recording tape cartridge 10 is not being used, without the number of parts increasing.

The top end surfaces 64 and the cam grooves 70 are provided at the tubular wall 62 of the braking member 52. The cam projections 86, which are slidably fit in the cam grooves 70, and the bottom end surfaces 82A, which restrict upward movement of the braking member 52 in a state in which the bottom end surfaces 82A abut the top end surfaces 64, are provided at the clutch member 74. In this way, the function of preventing joggling of the reel 28 when the recording tape cartridge 10 is not being used and the function of permitting rising-up of the reel 28 within the case when the recording tape cartridge 10 is being used, are realized with a simple structure. Moreover, the function of rotating the clutch member 74 in the direction of arrow C when the recording tape cartridge 10 is being used is realized by a simple structure by forming a crank mechanism by connecting the arm member 102 to the clutch member 74. In other words, the lock mechanism 50 can be realized with a simple structure.

In the lock mechanism 50, the release operation portion 104 of the arm member 102 is pushed by the pushing projection 120 which is provided independently of the rotating shaft 122 at the drive device, and the braking member 52 is held at its rotation permitting position in the state in which the pushing projection 120 abuts the release operation portion 104 (the state shown in FIG. 8B). Thus, there is no portion of the recording tape cartridge 10 which slidingly contacts parts of the drive device as the reel 28 is driven to rotate. Further, at times when the reel 28 is driven to rotate, the clutch member 74 is supported by the pushing projection 120 via the arm member 102. Therefore, the clutch member 74 does not follow the rotation of the reel 28. Moreover, the compression coil spring 100 is disposed between the braking member 52 and the clutch member 74, and does not apply urging force to the reel 28 at times when the reel 28 is driven to rotate. Thus, the compression coil spring 100 does not follow the rotation of the reel 28. Accordingly, when the reel 28 is driven to rotate, structural parts of the recording tape cartridge 10 do not slidingly contact one another.

In this way, at the recording tape cartridge 10, wear accompanying the driving and rotation of the reel 28 does not occur at all at the parts of the drive device or at the structural parts of the recording tape cartridge 10 itself. Further, at the recording tape cartridge 10, because the structural parts thereof do not slidingly contact one another when the reel 28 is driven to rotate, there is no need to absorb relative rotation between structural parts by using an expensive bearing or the like, and the recording tape cartridge 10 can be manufactured inexpensively.

The release operation portion 104 of the arm member 102 is exposed from the front surface of the case 12 which surface faces in the direction of arrow A, and the release operation portion 104 is pushed by the pushing projection 120 of the drive device and moves in the direction opposite to the direction of arrow A. Therefore, at the drive device, it suffices to merely fixedly provide the pushing projection 120 on the locus along which the release operation portion 104 moves due to the loading-in of the recording tape cartridge 10, and the structure of the drive device is simple.

Figure 10:
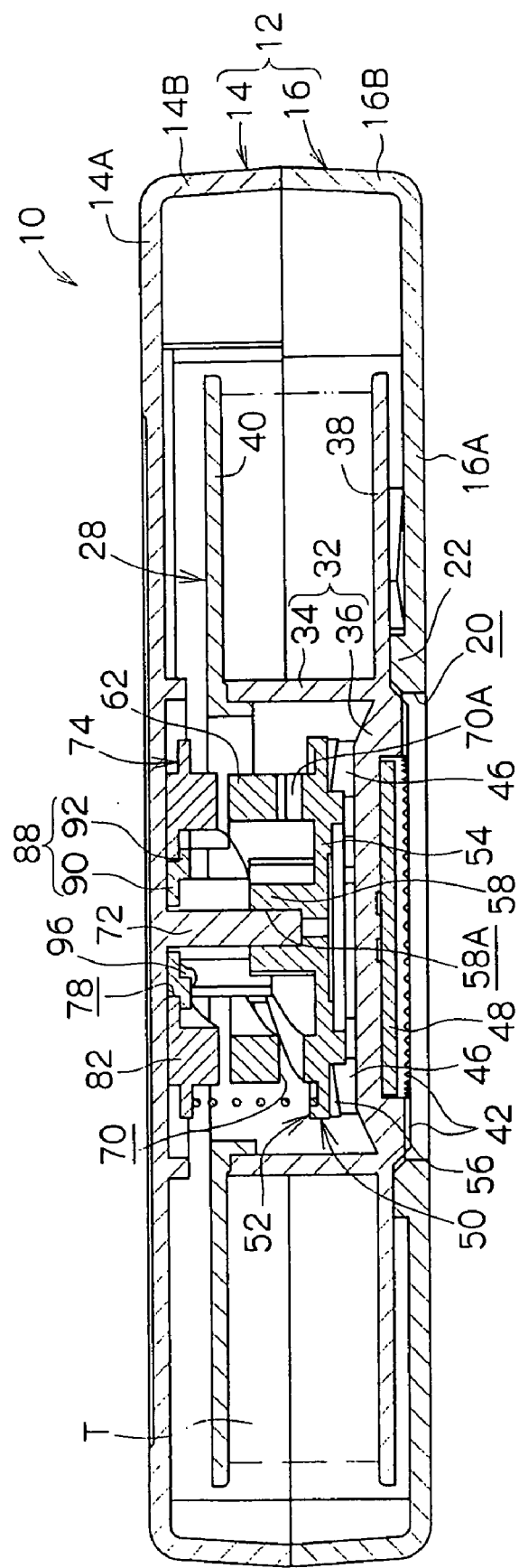
FIG. 10 is a sectional view taken along a central line intersecting the direction of loading into a drive device, and showing the modified example of the locking mechanism structuring the recording tape cartridge relating to the embodiment of the present invention.

In the above-described embodiment, the compression coil spring 100 is provided between the braking member 52 and the clutch member 74. However, the present invention is not limited to the same. For example, as shown in FIGS. 9 and 10, a structure which is not provided with the compression coil spring 100 may be used. In this case, in order to return the braking member 52 from the rotation permitting position to the rotation locking position, it is preferable that, for example, the release operation portion 104 is pulled in the direction of arrow A as the recording tape cartridge 10 is ejected from the bucket, or that an urging member (e.g., a torsion spring, a plate spring, a compression coil spring, a tension coil spring, or the like) is provided between the case 12 and the clutch member 74 or the arm member 102 in order to urge the clutch member 74 to rotate in the direction of arrow D. In these cases as well, because the cam grooves 70 and the cam projections 86 structure a positive motion cam mechanism, the braking member 52 is reliably returned from the rotation permitting position to the rotation locking position (even in cases in which the recording tape cartridge is used in a standing-type drive device or the like and the axial direction of the reel 28 does not coincide with the direction of gravity).

The above-described embodiment is a preferable structure in which the braking member 52 exhibits both the function of locking rotation of the reel 28 and the function of preventing joggling of the reel 28 when the recording tape cartridge 10 is not being used. However, the present invention is not limited to the same. For example, a movable member for preventing joggling of the reel 28 may be provided separately from the braking member 52 which is for locking rotation of the reel 28.

Further, the above-described embodiment is a preferable structure in which the braking member 52 is held at the rotation locking position when the recording tape cartridge 10 is not being used, due to the abutment of the top end surfaces 64 and the bottom end surfaces 82A which are substantially orthogonal to the axis of the reel 28. However, the present invention is not limited to the same. For example, a structure may be used in which the braking member 52 is held at the rotation locking position when the recording tape cartridge 10 is not being used, due to surfaces which are inclined with respect to the axis of the reel 28 abutting each other so as to not slide along one another due to axial direction force of a predetermined value or less (i.e., so that the frictional force resisting the component of force orthogonal to the inclined surfaces exceeds the component of force along the inclined surfaces). Accordingly, in a structure which does not have the compression coil spring 100, the braking member 52 may be held at the rotation locking position when the recording tape cartridge 10 is not being used, by the cam grooves 70 and the cam projections 86 whose angles of inclination with respect to the axis of the reel 28 and whose coefficients of friction are set appropriately.

Moreover, the above-described embodiment is structured such that the rotation of the clutch member 74 is converted into axial direction movement of the braking member 52 by the cam grooves 70 and the cam projections 86. However, the present invention is to limited to the same. For example, a mechanism (which may be a cam mechanism) which converts the rectilinear motion of the arm member 102, which moves the locking mechanism 50 along the ceiling plate 14A rectilinearly in a direction orthogonal to the axis of the reel 28, into axial direction movement of the braking member 52 may be provided between the braking member 52 and this arm member 102. Further, the lock mechanism 50 may be structured by providing the cam grooves 70 at the clutch member 74 and the cam projections 86 at the braking member 52. Or, the lock mechanism 50 may be structured by providing convex cam rails in place of the cam grooves 70, and contact elements whose cross-sections are substantially U-shaped and which contact the cam rails from the top and bottom both sides thereof. Further, the cam portion and the contact element in the present invention of course include structures such as, for example, the female screw and the male screw of a feed screw mechanism. In addition, it goes without saying that the cam portion and the contact element in the present invention do not have to structure a positive motion cam.

In the above-described embodiment, the clutch member 74 is provided substantially coaxially to the reel 28. However, the present invention is not limited to the same, and, for example, the clutch member 74 may be disposed at an eccentric position within the reel hub 32. Further, in the above-described embodiment, an example is given in which the braking member 52 is structured by one member. However, the present invention is not limited to the same, and for example, the engaging gear 44 may be provided in an annular form and the braking member 52 may be structured by a plurality of parts which are separated from one another in the peripheral direction. In this case, it is preferable that the plural parts of the braking member 52 synchronously move from the rotation locking positions to the rotation permitting positions due to the operation of the single release operation portion 104 by the pushing projection 120 of the drive device.

Although the above-described embodiment is a preferable structure in which the release operation portion 104 which is the pushed portion is exposed from the window portion 27 which is provided in the front surface of the case 12, the present invention is not limited to the same. For example, the release operation portion 104 may be exposed from a side wall of the case 12 running along the direction of arrow A, or may be exposed from the floor plate 16A, or may be exposed from the gear opening 20. In particular, in a structure in which the release operation portion 104, which passes through the floor portion 36 of the reel hub 32 and is exposed from the gear opening 20, slidingly contacts the rotating shaft 122, wear of the release operation portion 104 and the rotating shaft 122 can be prevented or markedly suppressed by utilizing a structure in which the compression coil spring 100 is not provided and friction resistance based on urging force of the compression coil spring 100 is not applied to the portion where there is sliding contact.

What is claimed is:

1. A recording tape cartridge comprising:
   a case comprising a first inner surface and a second inner surface opposite the first inner surface;
   a reel having, at an axially central portion thereof, a hub which is formed in a shape of a hollow cylinder having a floor and around whose outer peripheral portion a recording tape is wound, the reel being accommodated within the case and being able to approach and move away from the first inner surface of the case;
   a movable member provided within the hub so as to be able to approach and move away from the floor portion of the hub, and able to be set at a restricting position, at which the movable member has approached the floor portion and restricts moving-away of the reel, which is abutting the first inner surface of the case, from the first inner surface, and a rising-up permitting position, at which the movable member has moved away from the floor portion and permits moving-away of the reel from the first inner surface; and
   a switching section having a pushed portion which can be pushed from an exterior of the case, and provided between the second inner surface of the case and the movable member, and when the recording tape is not in use, the switching section holds the movable member at the restricting position, and when the pushed portion is pushed by a releasing portion of a drive device, the switching section releases a held state of the movable member and moves the movable member to the rising-up permitting position.

2. The recording tape cartridge of claim 1, wherein the movable member is supported so as to be unable to rotate with respect to the case, and the movable member is formed such that, when the movable member is positioned at the restricting position, the movable member engages with an engaging portion provided at the floor portion of the hub and impedes rotation of the reel with respect to the case, and when the movable member is positioned at the rising-up permitting position, an engaged state of the movable member with the engaging portion is released and the movable member permits rotation of the reel with respect to the case.

3. The recording tape cartridge of claim 2, wherein the holding of the movable member at the restricting position by the switching section is carried out by engagement of the movable member and the switching section.

4. The recording tape cartridge of claim 2, wherein the holding of the movable member at the restricting position by the switching section is carried out by frictional contact between the movable member and the switching section.

5. The recording tape cartridge of claim 1, wherein the switching section is structured so as to include;
   a rotating member provided so as to be able to rotate with respect to the case in a plane which is orthogonal to an axis of the reel and so as to be unable to move in a direction of the axis, and when the pushed portion is pushed by the releasing portion, the rotating member rotates in a predetermined direction with respect to the case;
   a pair of abutment surfaces formed respectively at the movable member and the rotating member substantially orthogonal to the direction of the axis, and when the movable member is positioned at the restricting position, the pair of abutment surfaces slidably abut one another, and as the rotating member rotates in the predetermined direction, a state of abutment between the abutment surfaces is cancelled; and
   a cam portion provided at one of the movable member and the rotating member, and as the rotating member rotates in the predetermined direction, the cam portion slides along a contact element provided at another of the movable member and the rotating member and moves the movable member away from the floor portion.

6. The recording tape cartridge of claim 5, wherein the switching section is structured so as to further include an arm member whose longitudinal direction is a direction intersecting the axis of the reel and whose longitudinal direction one end portion is the pushed portion and whose longitudinal direction other end portion is connected to the rotating member, and when the pushed portion is pushed by the releasing portion, the arm member rotates the rotating member in the predetermined direction while moving rectilinearly.

7. The recording tape cartridge of claim 6, wherein the pushed member is exposed at the case toward a side of loading the recording tape cartridge into the drive device, and is pushed by the releasing portion as the recording tape cartridge is loaded into the drive device.

8. The recording tape cartridge of claim 5, wherein the holding of the movable member at the restricting position by the switching section is carried out by engagement of the movable member and the switching section.

9. The recording tape cartridge of claim 5, wherein the holding of the movable member at the restricting position by the switching section is carried out by frictional contact between the movable member and the switching section.

10. The recording tape cartridge of claim 5, wherein a positive motion mechanism is structured by the cam portion and the contact element.

11. The recording tape cartridge of claim 1, wherein the movable member permits slight movement of the reel in the axial direction.

12. The recording tape cartridge of claim 1, wherein the holding of the movable member at the restricting position by the switching section is carried out by engagement of the movable member and the switching section.

13. The recording tape cartridge of claim 1, wherein the holding of the movable member at the restricting position by the switching section is carried out by frictional contact between the movable member and the switching section.

14. A recording tape cartridge comprising:
a reel having, at an axially central portion thereof, a hub which is formed in a shape of a hollow cylinder having a floor and around whose outer peripheral portion a recording tape is wound, the reel being accommodated within a case and being able to approach and move away from an inner surface of a floor plate of the case;
a movable member provided within the hub so as to be able to approach and move away from a floor portion of the hub, and able to be set at a restricting position, at which the movable member has approached the floor portion and restricts moving-away of the reel, which is abutting the inner surface of the floor plate, from the floor plate, and a rising-up permitting position, at which the movable member has moved away from the floor portion and permits moving-away of the reel from the floor plate; and
a switching section having a pushed portion which can be pushed from an exterior of the case, and provided between the case and the movable member, and when the recording tape is not in use, the switching section holds the movable member at the restricting position, and when the pushed portion is pushed by a releasing portion of a drive device, the switching section releases a held state of the movable member and moves the movable member to the rising-up permitting position,
wherein the movable member is supported so as to be unable to rotate with respect to the case, and the movable member is formed such that, when the movable member is positioned at the restricting position, the movable member engages with an engaging portion provided at the floor portion of the hub and impedes rotation of the reel with respect to the case, and when the movable member is positioned at the rising-up permitting position, an engaged state of the movable member with the engaging portion is released and the movable member permits rotation of the reel with respect to the case.

15. The recording tape cartridge of claim 14, wherein the holding of the movable member at the restricting position by the switching section is carried out by engagement of the movable member and the switching section.

16. The recording tape cartridge of claim 14, wherein the holding of the movable member at the restricting position by the switching section is carried out by frictional contact between the movable member and the switching section.

17. A recording tape cartridge comprising:
a reel having, at an axially central portion thereof, a hub which is formed in a shape of a hollow cylinder having a floor and around whose outer peripheral portion a recording tape is wound, the reel being accommodated within a case and being able to approach and move away from an inner surface of a floor plate of the case;
a movable member provided within the hub so as to be able to approach and move away from a floor portion of the hub, and able to be set at a restricting position, at which the movable member has approached the floor portion and restricts moving-away of the reel, which is abutting the inner surface of the floor plate, from the floor plate, and a rising-up permitting position, at which the movable member has moved away from the floor portion and permits moving-away of the reel from the floor plate; and
a switching section having a pushed portion which can be pushed from an exterior of the case, and provided between the case and the movable member, and when the recording tape is not in use, the switching section holds the movable member at the restricting position, and when the pushed portion is pushed by a releasing portion of a drive device, the switching section releases a held state of the movable member and moves the movable member to the rising-up permitting position,
wherein the switching section is structured so as to include;
a rotating member provided so as to be able to rotate with respect to the case in a plane which is orthogonal to an axis of the reel and so as to be unable to move in a direction of the axis, and when the pushed portion is pushed by the releasing portion, the rotating member rotates in a predetermined direction with respect to the case;
a pair of abutment surfaces formed respectively at the movable member and the rotating member substantially orthogonal to the direction of the axis, and when the movable member is positioned at the restricting position, the pair of abutment surfaces slidably abut one another, and as the rotating member rotates in the predetermined direction, a state of abutment between the abutment surfaces is cancelled; and
a cam portion provided at one of the movable member and the rotating member, and as the rotating member rotates in the predetermined direction, the cam portion slides along a contact element provided at another of the movable member and the rotating member and moves the movable member away from the floor portion.

18. The recording tape cartridge of claim 17, wherein the switching section is structured so as to further include an arm member whose longitudinal direction is a direction intersecting the axis of the reel and whose longitudinal direction one end portion is the pushed portion and whose longitudinal direction other end portion is connected to the rotating member, and when the pushed portion is pushed by the releasing portion, the arm member rotates the rotating member in the predetermined direction while moving rectilinearly.

19. The recording tape cartridge of claim 18, wherein the pushed member is exposed at the case toward a side of loading the recording tape cartridge into the drive device, and is pushed by the releasing portion as the recording tape cartridge is loaded into the drive device.

20. The recording tape cartridge of claim 17, wherein the holding of the movable member at the restricting position by the switching section is carried out by engagement of the movable member and the switching section.

21. The recording tape cartridge of claim 17, wherein the holding of the movable member at the restricting position by the switching section is carried out by frictional contact between the movable member and the switching section.

22. The recording tape cartridge of claim 17, wherein a positive motion mechanism is structured by the cam portion and the contact element.

23. A recording tape cartridge comprising:
a reel having, at an axially central portion thereof, a hub which is formed in a shape of a hollow cylinder having a floor and around whose outer peripheral portion a recording tape is wound, the reel being accommodated within a case and being able to approach and move away from an inner surface of a floor plate of the case;
a movable member provided within the hub so as to be able to approach and move away from a floor portion of the hub, and able to be set at a restricting position, at which the movable member has approached the floor portion and restricts moving-away of the reel, which is abutting the inner surface of the floor plate, from the floor plate, and a rising-up permitting position, at which the movable member has moved away from the floor portion and permits moving-away of the reel from the floor plate; and a switching section having a pushed portion which can be pushed from an exterior of the case, and provided between the case and the movable member, and when the recording tape is not in use, the switching section holds the movable member at the restricting position, and when the pushed portion is pushed by a releasing portion of a drive device, the switching section releases a held state of the movable member and moves the movable member to the rising-up permitting position, wherein the holding of the movable member at the restricting position by the switching section is carried out by engagement of the movable member and the switching section.

24. A recording tape cartridge comprising:

a reel having, at an axially central portion thereof, a hub which is formed in a shape of a hollow cylinder having a floor and around whose outer peripheral portion a recording tape is wound, the reel being accommodated within a case and being able to approach and move away from an inner surface of a floor plate of the case;

a movable member provided within the hub so as to be able to approach and move away from a floor portion of the hub, and able to be set at a restricting position, at which the movable member has approached the floor portion and restricts moving-away of the reel, which is abutting the inner surface of the floor plate, from the floor plate, and a rising-up permitting position, at which the movable member has moved away from the floor portion and permits moving-away of the reel from the floor plate; and a switching section having a pushed portion which can be pushed from an exterior of the case, and provided between the case and the movable member, and when the recording tape is not in use, the switching section holds the movable member at the restricting position, and when the pushed portion is pushed by a releasing portion of a drive device, the switching section releases a held state of the movable member and moves the movable member to the rising-up permitting position, wherein the holding of the movable member at the restricting position by the switching section is carried out by frictional contact between the movable member and the switching section.

25. A recording tape cartridge comprising:

a case;

a reel, comprising a hub around which a recording tape is wound, and a floor at a first axial end of the hub, the reel being axially movable within the case between a stationary position where the reel abuts a first inner surface of the case, and a movable position where the reel is separated from the first inner surface of the case;

a braking member within the hub, the braking member arranged to engage with the floor portion when the reel is at the stationary position, and to disengage from the floor portion when the reel is at the movable position; and a clutch member interfacing with the braking member and rotatably arranged with respect to the case so that, when the clutch member is rotated in a first direction, the braking member moves toward the floor portion, and when the clutch member is rotated in the second direction, the braking member moves away from the floor portion.

26. The recording tape cartridge of claim 25, wherein the braking member and clutch member comprise opposing angled surfaces contacting each other to provide the movement of the braking member.

27. The recording tape cartridge of claim 25, further comprising a compression spring arranged between the braking member and clutch member.

28. The recording tape cartridge of claim 25, further comprising an elongated plate-shaped arm member connected to the clutch member and extending to an opening in the case.

29. The recording tape cartridge of claim 25, wherein the braking member is rotationally fixed with respect to the first inner surface of the case.

30. The recording tape cartridge of claim 25, further comprising a rib projecting from a second inner face of the case, wherein;

the second inner face of the case is opposite to the first inner face of the case;

the braking member is axially movable on the rib with respect to the second inner face of the case;

the braking member is rotationally fixed by the rib with respect to the second inner face of the case;

the clutch member is rotationally provided on the rib with respect to the second inner face of the case; and the clutch member is arranged between the second inner face of the case and the braking member.

31. The recording tape cartridge of claim 28, wherein the rib is cross-shaped.

* * * * *